(12) United States Patent
Lu et al.

(10) Patent No.: US 12,454,765 B2
(45) Date of Patent: Oct. 28, 2025

(54) CATALYST AND ANODE FOR HYDROGEN PRODUCTION BY ELECTROLYSIS AS WELL AS PREPARATION METHOD, ACTIVATION METHOD AND USE THEREOF

(71) Applicant: NINGBO INSTITUTE OF MATERIALS TECHNOLOGY AND ENGINEERING, CHINESE ACADEMY OF SCIENCES, Ningbo (CN)

(72) Inventors: Zhiyi Lu, Ningbo (CN); Haocheng Chen, Ningbo (CN); Wenwen Xu, Ningbo (CN)

(73) Assignee: NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 0 days.

(21) Appl. No.: 19/104,715

(22) PCT Filed: May 15, 2024

(86) PCT No.: PCT/CN2024/093372
§ 371 (c)(1),
(2) Date: Feb. 19, 2025

(87) PCT Pub. No.: WO2024/255512
PCT Pub. Date: Dec. 19, 2024

(65) Prior Publication Data
US 2025/0257483 A1    Aug. 14, 2025

(30) Foreign Application Priority Data
Jun. 16, 2023 (CN) .......................... 202310720257.3
Apr. 15, 2024 (CN) .......................... 202410452007.0

(51) Int. Cl.
C25B 11/075 (2021.01)
C25B 1/04 (2021.01)

(52) U.S. Cl.
CPC .............. *C25B 11/075* (2021.01); *C25B 1/04* (2013.01)

(58) Field of Classification Search
CPC ........... B01J 35/73; C25B 11/045; C25B 1/04
USPC ................ 502/300, 305, 313–316, 324, 355
See application file for complete search history.

(56) References Cited

U.S. PATENT DOCUMENTS

| | | | |
|---|---|---|---|
| 5,393,722 A * | 2/1995 | Holmgren | .............. B01J 23/002 502/328 |
| 11,258,071 B2 | 2/2022 | Rezvani et al. | |
| 2019/0229344 A1 | 7/2019 | Rezvani et al. | |
| 2022/0002887 A1 | 1/2022 | Zhao et al. | |

FOREIGN PATENT DOCUMENTS

| | | | | |
|---|---|---|---|---|
| CN | 102161526 A | 8/2011 | | |
| CN | 106693978 A | * 5/2017 | ........... | C25B 11/077 |
| CN | 114196971 A | 3/2022 | | |
| CN | 114657591 A | 6/2022 | | |
| CN | 114808001 A | 7/2022 | | |
| CN | 115305481 A | 11/2022 | | |
| CN | 116161704 A | * 5/2023 | ............. | C01G 53/82 |
| CN | 114657591 B | 8/2023 | | |
| WO | 2021184601 A1 | 9/2021 | | |
| WO | 2022252943 A1 | 12/2022 | | |
| WO | WO-2024243644 A1 | * 12/2024 | ........... | C25B 11/077 |

OTHER PUBLICATIONS

Li Chun, et al., Tungsten Doped Iron_Nickel Layered Hydroxide for Oxygen Evolution and Hydrogen Evolution Reaction, Chinese Journal of Inorganic Chemistry, 2020, pp. 1492-1498, vol. 36 No. 8.

Huachuan Sun, et al., Rh-engineered ultrathin NiFe-LDH nanosheets enable highly-efficient overall water splitting and urea electrolysis, Applied Catalysis B: Environmental, 2021, pp. 1-12, vol. 284.

* cited by examiner

*Primary Examiner* — Patricia L. Hailey
(74) *Attorney, Agent, or Firm* — Bayramoglu Law Offices LLC

(57) ABSTRACT

A catalyst and anode for hydrogen production by electrolysis as well as a preparation method, activation method and use thereof are provided. The anode for hydrogen production by electrolysis includes a catalyst which is nickel iron barium hydrotalcite with a nano hexagonal sheet structure and a thickness of 100-200 nm. The catalyst can be prepared by a one-step solvothermal reaction method. Alkaline-earth metal ions are evenly doped in the nickel iron barium hydrotalcite and are in atomic level dispersion, so that the anode for hydrogen production by electrolysis based on the catalyst, when being applied to a process for hydrogen production by electrolysis of an aqueous solution containing chlorine ions, not only can maintain good catalytic performance, but also has greatly improved chlorine ion corrosion resistance, leading to significant improvement of working stability and service life.

19 Claims, 8 Drawing Sheets

CATALYST AND ANODE FOR HYDROGEN PRODUCTION BY ELECTROLYSIS AS WELL AS PREPARATION METHOD, ACTIVATION METHOD AND USE THEREOF

CROSS REFERENCE TO THE RELATED APPLICATIONS

This application is the national phase entry of International Application No. PCT/CN2024/093372, filed on May 15, 2024, which is based upon and claims priority to Chinese Patent Application No. 202310720257.3, filed on Jun. 16, 2023, and Chinese Patent Application No. 202410452007.0, filed on Apr. 15, 2024, the entire contents of which are incorporated herein by reference.

TECHNICAL FIELD

The present disclosure belongs to the technical fields of materials and energy catalysis, and particularly relates to a catalyst and anode for hydrogen production by electrolysis, as well as a preparation method, activation method and use thereof.

BACKGROUND

In energy industry, carbon emission occupies ⅔ of a total emission amount of global greenhouse gases. Hydrogen is one of the most promising energy carriers, which can replace fossil fuel to solve the future global warming effect. Hydrogen production by electrolysis of water driven by renewable energy sources can provide a new approach for relieving the current energy shortage without affecting the sustainability of an environment.

Hydrogen produced by electrolysis of water is relatively high in purity, high energy consumption formed by electrolysis of water can be reduced by technical means, however, limited fresh water resources can greatly restrict the development and large-scale application of electrolysis of water. From a practical perspective, direct electrolysis of seawater has huge advantages, rich seawater reserves on earth are the fundamental support for achieving large-scale application of seawater electrolysis, and similarly has the ability of producing high-purity hydrogen.

However, there are some serious issues that need to be solved when in direct electrolysis of seawater. For example, hydrogen production by electrolysis of seawater superficially includes two half reactions, which are an anodic oxygen evolution reaction and a cathode hydrogen evolution reaction, respectively. Under the alkaline condition, the kinetics of oxygen evolution reaction (OER) is slow, and high-concentration chloride ions in seawater can compete with anodic OER and seriously corrode the anode, thereby shortening the service life of the anode. Although catalysts such as $RuO_2$ and $IrO_2$ have been utilized as anodes for electrolysis, it is urgent to develop a high-activity, high-selectivity, good-stability, low-cost, rich-reserve OER catalyst.

In the previous researches, a series of OER catalysts in an alkaline solution have been developed, including hydroxides, metal oxides, sulfides and phosphides. However, under the industrial current density, seawater electrolysis has not yet reached long-term stability (100-1000 h). Therefore, it is urgent to develop an efficient and stable anode for hydrogen production by electrolysis of seawater.

Some non-noble metal oxygen-evolution catalysts nickel iron hydrotalcites (refer to CN114657591A and CN114657591B) have been widely reported and researched due to their characteristics of excellent performance and low cost, but they are prone to corrosion in seawater, leading to their short service lives, thereby seriously restricting the application of them in an aqueous solution containing chlorine ions, especially in hydrogen production by electrolysis of seawater.

SUMMARY

The main objective of the present disclosure is to provide a catalyst and anode for hydrogen production by electrolysis as well as a preparation method, activation method and use thereof in order to overcome the defects in the prior art.

In order to achieve the above objective, the technical solution adopted in the present disclosure is as follows:

The first aspect of the present disclosure provides a catalyst for hydrogen production by electrolysis, wherein the chemical formula of the catalyst is $[M_{1-x}N_xM'(OH)_2]^{n+}[(A^{n-})_{x/n} \cdot mH_2O]^{x-}$, M and N are any two of scandium, vanadium, chromium, manganese, iron, cobalt and nickel ions, and M and N are respectively +2 and +3 valent, M' is selected from alkaline-earth metal ions and dispersed in the catalyst in an atomic level, $A^{n-}$ is selected from $CO_3^{2-}$, $NO_3^{2-}$, $Cl^-$, $OH^-$ or $SO_4^{2-}$, x=0.17-0.33, m is an integer of more than or equal to 0, and n is 1-3.

The second aspect of the present disclosure provides a preparation method of a catalyst for hydrogen production by electrolysis, including: performing a hydrothermal reaction on a mixed reaction solution containing M, N and M' to prepare the catalyst for hydrogen production by electrolysis having a chemical formula of $[M_{1-x}N_xM'(OH)_2]^{x+}[(A^{n-})_{x/n} \cdot mH_2O]^{x-}$, wherein M and N are any two of scandium, vanadium, chromium, manganese, iron, cobalt and nickel ions, and M and N are respectively in +2 and +3 valent, M' is selected from alkaline-earth metal ions and dispersed in the catalyst in an atomic level, $A^{n-}$ is selected from $CO_3^{2-}$, $NO_3^{2-}$, $Cl^-$, $OH^-$ or $SO_4^{2-}$, x=0.17-0.33, m is an integer of more than or equal to 0, and n=1-3.

The third aspect of the present disclosure provides an activated catalyst for hydrogen production by electrolysis, including the catalyst for hydrogen production by electrolysis and a sulfate activating layer, wherein the sulfate activating layer includes sulfate ions distributed on the surface of the catalyst, and the sulfate ions bind to alkali earth metal ions in the catalyst.

The fourth aspect of the present disclosure provides an anode for hydrogen production by electrolysis of seawater, including the catalyst for hydrogen production by electrolysis or the activated catalyst for hydrogen production by electrolysis.

The fifth aspect of the present disclosure provides use of the catalyst for hydrogen production by electrolysis, the activated catalyst for hydrogen production by electrolysis or the anode for hydrogen production by electrolysis in hydrogen production by electrolysis.

The sixth aspect of the present disclosure provides a method for hydrogen production by electrolysis, including: placing an anode and cathode for hydrogen production by electrolysis in an aqueous solution containing chlorine ions, and applying a working voltage between the anode and the cathode, thereby achieving hydrogen production by electrolysis.

The seventh aspect of the present disclosure provides a system for hydrogen production by electrolysis, including an anode and a cathode, wherein the system for hydrogen production by electrolysis is used for performing hydrogen production by electrolysis on the aqueous solution containing chlorine ions, and the anode includes the anode for hydrogen production by electrolysis.

Compared with the prior art, the present disclosure at least has the following beneficial effects:

(1) The provided catalyst for hydrogen production by electrolysis provides rich coordination environments for alkaline-earth metal elements such as Ca, Sr and Ba through oxygen sites on the surface of the hydrotalcite, so that the alkaline-earth metal elements can be evenly doped in the hydrotalcite in a form of atomic-level dispersion, wherein the preferred alkaline-earth metal element is Ba; and the addition amount of the alkaline-earth metal elements in the process of synthesis is controlled in 0.1-1 mmol/L, which ensures that the catalyst maintains good catalytic performance, and the voltage range in a three-electrode system is 1.52-1.55 V under the working condition current of 400 mA/cm$^2$.

(2) Through the addition of atomic-level dispersed doping elements, the provided catalyst for hydrogen production by electrolysis only needs to receive simple activation treatment so as to, when being applied to the aqueous solution containing chlorine ions for hydrogen production by electrolysis, not only maintain excellent catalytic performance, with the catalytic selectivity of the anode being more than 99.7%, but also improve the stability significantly.

(3) The preparation process of the provided catalyst for hydrogen production by electrolysis is simple and can be achieved by one-step solvothermal reaction, and the provided catalyst is cheap and easily available in raw material, is suitable for large-scale production, and is of important significance for promoting the popularization application of hydrogen production by electrolysis of seawater.

BRIEF DESCRIPTION OF THE DRAWINGS

To more clearly illustrate the embodiments of the present disclosure or the technical solution in the prior art, the accompanying drawings required to be used in the embodiments or the descriptions in the prior art will be simple introduced below, obviously, the accompanying drawings in the following description are only some embodiments recorded in the present disclosure, other accompanying drawings can also be obtained according to these accompanying drawings by persons of ordinary skill in the art without creative efforts.

DETAILED DESCRIPTION OF THE EMBODIMENTS

Figure 1:
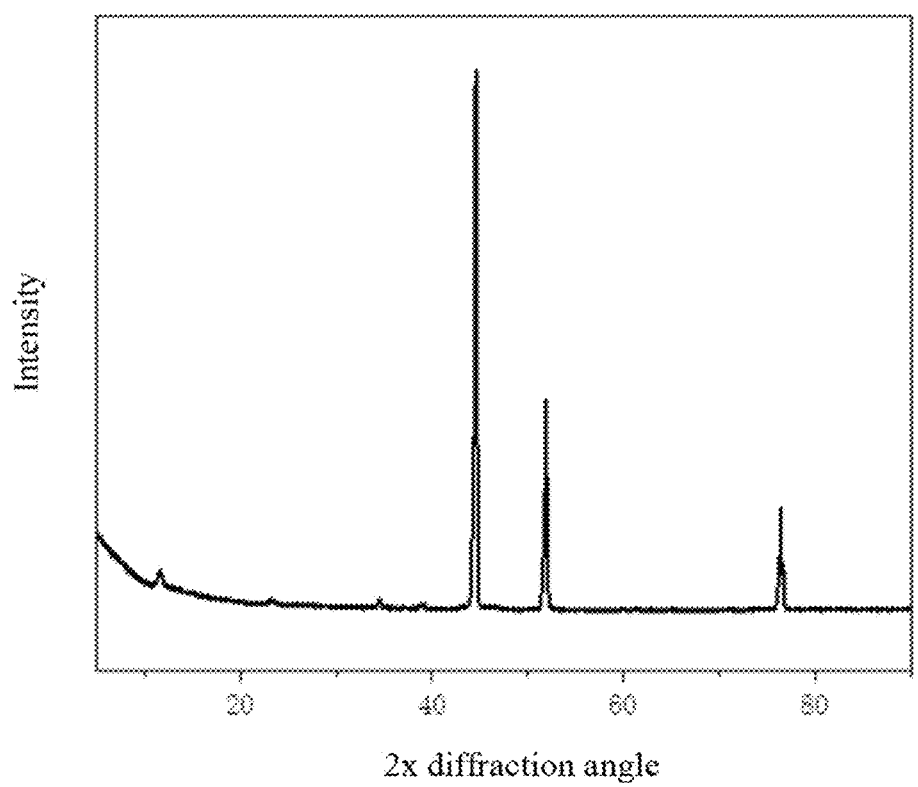
FIG. 1 is an X-ray diffraction pattern of an anode for hydrogen production by electrolysis provided in example 2.

In view of the defects in the prior art, the inventor of this case proposes the technical solution of the present disclosure via long-term researches and lots of practices. Next, the technical solution, its implementation process and principle and the like will be further explained and illustrated.

The following description will state many specific details to facilitate the sufficient understanding of the present disclosure, however, the present disclosure can also be implemented by using other methods different from the method described here, and therefore the scope of protection of the present disclosure is not limited by the specific embodiments disclosed below.

Furthermore, relationship terms such as "first" and "second" are only used for distinguishing one substance or method step from another substance or method step having the same name, but are not necessary to require or imply that there are any actual relationships or order between these substances or method steps.

Some embodiments of the present disclosure provide a catalyst for hydrogen production by electrolysis, wherein the chemical formula of the catalyst is $[M_{1-x}N_xM'(OH)_2]^{x+}[(A^{n-})_{x/n} \cdot mH_2O]^{x-}$, M and N are any two of scandium, vanadium, chromium, manganese, iron, cobalt and nickel ions, and M and N are respectively +2 and +3 valent, M' is selected from alkaline-earth metal ions and is dispersed in the catalyst in an atomic level, $A^{n-}$ is selected from $CO_3^{2-}$, $NO_3^{2-}$, $Cl^-$, $OH^-$ or $SO_4^{2-}$, wherein, x=0.17-0.33, m is an integer of more than or equal to 0, preferably a natural number, and in general, m decreases with the increase in x, and n is 1-3. In some cases, m can be calculated according to the following expression, that is, m=(1−α×x/n), wherein a is the number of positions occupied by $A^{n-}$ in the stratified structure of the catalyst. In some cases, the value of m is 1-9.

In one embodiment, the catalyst has at least one of the following features:

ix) M and N are any two of iron, cobalt and nickel ions;

x) M' is selected from $Ca^{2+}$, $Sr^{2+}$ or $Ba^{2+}$;

xi) $A^{n-}$ is selected from $CO_3^{2-}$, $NO_3^{2-}$, $OH^-$ or $SO_4^{2-}$;

xii) the atomic percentage content of M' in the catalyst is 0.4%-0.5%.

Further, the catalyst has at least one of the following features:
1) M' is $Ba^{2+}$;
2) $A^{n-}$ is selected from $CO_3^{2-}$ or $SO_4^{2-}$.

Exemplarily, M and N are respectively $Ni^{2+}$ and $Fe^{3+}$, M' is $Ba^{2+}$, and $A^{n-}$ is $CO_3^{2-}$.

In the present disclosure, M' is selected from $Ba^{2+}$. For example, the catalyst is barium-doping nickel iron hydrotalcite, wherein M and N are respectively $Ni^{2+}$ and $Fe^{3+}$, and the atomic percentage content of the barium element in the catalyst is 0.4%-0.5%, wherein if the content of the barium element is too low, it will lead to less fixed sulfate, the catalyst cannot be comprehensively protected, conversely, if the content of the barium element is too high, it will adversely affect the performance of the catalyst.

In one embodiment, the catalyst has a nano hexagonal sheet structure.

Further, the nano hexagonal sheet structure has at least one of the following features: a) a thickness is 100-200 nm; b) an area is 0.01-0.05 μm².

By taking the catalyst being barium-doping nickel iron hydrotalcite as an example, when the catalyst is used for preparing the anode and used for hydrogen production by electrolysis in an aqueous solution containing chloride ions, if the aqueous solution contains sulfate ions, the sulfate ions react with the barium ions in the catalyst to generate barium sulfate so as to form a fixed sulfate activating layer (hereinafter referred to as a sulfate activating layer or a chlorine removing layer) for chlorine removal, so as to hinder that other chloride ions in the solution are further adsorbed on the surface of the catalyst, thereby achieving the effect of delaying chloride ion corrosion, improving the stability of the catalyst and the corrosion resistance of the anode and greatly extending the service life of the anode. At the same time, the appropriately doped barium and barium sulfate nano layer structure basically do not affect the catalytic activity of the catalyst. When the aqueous solution does not contain or contains less sulfate ions, the catalyst can be activated in advance through an alkaline sulfate solution so that the foregoing sulfate activating layer is formed on the surface of the catalyst, and then the catalyst is applied to the aqueous solution containing chlorine ions for hydrogen production by electrolysis, which similarly achieves the effects of improving the stability of the catalyst and corrosion resistance of the anode, and prolonging the service life of the anode.

Some embodiments of the present disclosure also provide a preparation method of the catalyst for hydrogen production by electrolysis, including: performing a hydrothermal reaction on a mixed reaction solution containing M, N and M' to prepare the catalyst for hydrogen production by electrolysis, wherein the catalyst has a chemical formula of $[M_{1-x}N_xM'(OH)_2]^{x+}[(A^{n-})_{x/n}mH_2O]^{x-}$, M and N are any two of scandium, vanadium, chromium, manganese, iron, cobalt and nickel ions, and M and N are respectively in +2 and +3 valent, M' is selected from alkaline-earth metal ions and dispersed in the catalyst in an atomic level, $A^{n-}$ is selected from $CO_3^{2-}$, $NO_3^{2-}$, $Cl^-$, $OH^-$ or $SO_4^{2-}$, and the values of x, m and n are as described above.

In one embodiment, the preparation method specifically includes: performing a hydrothermal reaction on a mixed reaction solution containing a first transition metal compound, a second transition metal compound and an alkaline-earth metal compound in a molar ratio of (2-5):(2-5):(0.4-1) at 90-120° C. to prepare the catalyst; wherein, the first transition metal compound, the second transition metal compound and the alkaline-earth metal compound respectively contain M, N and M', and the pH value of the mixed reaction solution is 8-10.

In one embodiment, the preparation method further specifically includes:
mixing the first transition metal compound, the second transition metal compound and the alkaline-earth metal compound with water to form a metal salt solution, and adding an alkaline substance to adjust the pH value of the metal salt solution to 8-10, thereby obtaining the mixed reaction solution; and
reacting the mixed reaction solution for 8-12 h at 90-120° C. to prepare the catalyst.

In one embodiment, the first transition metal compound includes a soluble nickel salt such as nickel nitrate and nickel chloride, the second transition metal compound includes a soluble iron salt such as iron nitrate and iron chloride, and the alkaline-earth metal compound includes a soluble barium salt such as barium nitrate and barium chloride.

In one embodiment, the concentrations of the first transition metal compound, the second transition metal compound and the alkaline-earth metal compound contained in the mixed reaction solution are respectively 0.1-1 mmol/L, 0.2-0.5 mmol/L and 0.1-1 mmol/L.

In one embodiment, the alkaline substance includes any one of urea, hexamethylenetetraammonium or triethanolamine, or a combination thereof, and is not limited thereto.

The preparation method of the catalyst for hydrogen production by electrolysis can be achieved by one-step solvothermal reaction, is simple to operate, does not need harsh reaction conditions such as high temperature and high pressure and notable reaction equipment, and the raw materials are mainly common metal salts which are cheap and easily available, low in cost and environmental-friendly.

Some embodiments of the present disclosure also provide an activated catalyst for hydrogen production by electrolysis, including the catalyst for hydrogen production by electrolysis and a sulfate activating layer, wherein the sulfate activating layer includes sulfate ions distributed on the surface of the catalyst, and the sulfate ions bind to the alkaline-earth metal ions. Further, after the sulfate ions bind to the alkaline-earth metal ions, a nano layer structure can be formed on the surface of the catalyst, and the nano layer structure is mainly composed of nano particles with a particle size of larger than 0 nm but less than 5 nm. For example, if the alkaline-earth metal ion is a barium ion, the nano particle is a barium sulfate nano particle.

Some embodiments of the present disclosure also provide an activation method of a catalyst for hydrogen production by electrolysis, including placing the catalyst in an alkaline solution containing sulfate ions, and activating the catalyst using an electrochemical method.

In one embodiment, the electrochemical method used for activation includes but is not limited to cyclic voltammetry For example, the electrochemical method is cyclic voltammetry, wherein the used scanning voltage is 0 V-1 V, the scanning voltage speed is 5 mV/s-50 mV/s, and the scanning cycles are 10-30 cycles, so that the above nano particles are uniformly distributed, avoiding the agglomeration of the nano particles.

In one embodiment, the alkaline solution contains sulfate ions with a concentration of 0.01-0.1 mol/L so that the above nano particles are small in size and uniformly distributed, and the activity of the catalyst is not affected after covering on the surface of the catalyst, that is, the formed sulfate activating layer can not only hinder the entry of the chlorine ions, but also has sufficient channels to allow the contact of water molecules with the catalyst.

In one embodiment, the alkaline solution contains a sulfate salt, and the sulfate salt includes sodium sulfate or potassium sulfate, etc., and is not limited thereto.

In one embodiment, the alkaline solution contains an alkaline substance with a concentration of 0.1-1 mol/L, wherein the alkaline substance can include but is not limited to sodium hydroxide or potassium hydroxide, etc.

Some embodiments of the present disclosure also provide an anode for hydrogen production by electrolysis, including the catalyst for hydrogen production by electrolysis or the activated catalyst for hydrogen production by electrolysis.

In one embodiment, a plurality of the catalyst nanosheets are erectly arranged on the surface of the anode, and mutually and intensively arranged to form an array structure.

In one embodiment, the specific surface area of the array structure is 40-50 $m^2/g$.

In one embodiment, the anode also includes a conducting substrate for loading the catalyst, wherein the conducting substrate includes foam nickel, a nickel mesh, foam iron or foam nickel iron, etc., and is not limited thereto.

In some cases, the conducting substrate is also considered as an anode collector.

Some embodiments of the present disclosure also provide a preparation method of the catalyst for hydrogen production by electrolysis, including: placing the conducting substrate into a mixed reaction solution containing a first transition metal compound, a second transition metal compound and an alkaline-earth metal compound in a molar ratio of (2-5):(2-5):(0.4-1) and performing a hydrothermal reaction on the above solution at 90-120° C. so as to generate the catalyst for hydrogen production by electrolysis on the conducting substrate in situ.

Exemplarily, the preparation method of the anode for hydrogen production by electrolysis is to use a one-step hydrothermal method to prepare an anode for hydrogen production by electrolysis of nickel iron barium hydrotalcite. The preparation method specifically includes the following steps:

(1) mixing a first transition metal compound, a second transition metal compound and a alkaline-earth metal compound in a molar ratio of (2-5):(2-5):(0.4-1) and adding the obtained mixture into an aqueous solution to obtain a metal salt solution, and adding an alkaline substance to adjust the pH value of the metal salt solution to 8-10.

Preferably, the first transition metal compound includes a nickel salt, and the second transition metal compound includes an iron salt.

(2) Adding a conducting substrate into the above mixed solution to react for 8-12 h at the temperature of 90-120° C. to obtain an anode material.

As some typical application examples, a solution prepared by nickel iron hydrotalcite can be used as a solvent, and a densely coated catalyst slowly grows on the conducting substrate in situ as an anode in comparative example; a solution prepared by nickel iron barium hydrotalcite is used as a solvent, a densely coated catalyst slowly grows on the conducting substrate in situ, the prepared anode catalyst has an excellent ability of oxygen evolution performance by electrocatalysis of seawater and resistance to chlorine corrosion. Therefore, the anode can be used for hydrogen production by catalytic electrolysis.

In the process of hydrogen production by electrolysis without sulfate, the catalyst loaded by the anode, i.e., nickel iron barium hydrotalcite, is activated in the sulfate solution in advance to fix the sulfate layer on the surface of the catalyst; in the process hydrogen production by electrolysis with sulfate, the sulfate ions in the solution can react with barium in the hydrotalcite to generate barium sulfate to form a fixed sulfate layer for chlorine removal, thereby hindering other chlorine ions in the solution to be further adsorbed on the surface of the electrode, achieving the effect of delaying the chlorine ion corrosion of the anode. Furthermore, the proper barium doping and the barium sulfate nano layer structure do not greatly affect the catalysis of the anode, thereby improving the stability of the anode in a reaction for hydrogen production by electrolysis of seawater.

Of course, the above technical solution can also include steps of material characterization, selectivity and stability test characterization on the anode after hydrogen production by electrolysis of seawater. These steps can be for quality monitoring or for in-depth research, whether or not characterization is performed and by what means, they are within the scope of protection of the present disclosure. The material characterization of the modified anode can include but is not limited to: X-ray diffraction (XRD) and X-ray photoelectron spectroscopy (XPS) characterizations to determine the characteristics of the coated material; scanning electron microscopy (SEM) and transmission electron microscopy (TEM) characterizations to characterize material morphology, lattice and element content; the selectivity and stability characterization of the modified anode can include but is not limited to: linear sweep voltammetry (LSV) and i-t constant current test.

The inventor found that the characteristics such as morphology, thickness and layer coverage of the above nickel iron barium nanosheets are key features for effectively removing chlorine without significant adverse influence on catalytic efficiency. To form this feature, it is necessary to uniquely design the process parameters for depositing the above nickel iron barium nano layer to form the above special morphology, such as solution concentration, hydrothermal temperature and hydrothermal time during the hydrothermal deposition. Only by setting up a suitable deposition process can the above unique morphology of the nickel iron barium nano layer be formed.

In one embodiment, the preparation method of the anode for hydrogen production by electrolysis includes evenly doping barium in the anode using a hydrothermal method, wherein the used hydrothermal solution includes a nickel salt, an alkaline-earth metal salt and an iron salt in a molar ratio of 2-5:0.4-1:2-5, and additional alkaline substances, wherein the alkaline-earth metal salt includes but is not limited to barium nitrate, and the concentration of the alkaline-earth metal salt in the hydrothermal solution is 0.1-1 mmol/L; the nickel salt includes but is not limited to nickel nitrate, and the concentration of the nickel salt in the hydrothermal solution is 0.1-1 mmol/L; the iron salt includes but is not limited to iron nitrate, and the concentration of the iron salt in the hydrothermal solution is 0.2-0.5 mmol/L; the alkaline substance includes but is not limited to any one or more of urea, hexamethylenetetraammonium or triethanolamine, and the concentration of the alkaline substance in the hydrothermal solution is 1-20 mmol/L.

The hydrothermal temperature used in the hydrothermal method can be 80-150° C., preferably 90-120° C., and the hydrothermal time can be 4-48 h, preferably 8-12 h. The method for co-deposition of nickel iron barium by a hydrothermal method includes heating a conducting substrate in a hydrothermal solution to deposit barium ions in the solution onto the conducting substrate, and dispersing the barium ions in a catalyst in an atomic level.

In one embodiment, the preparation method of the anode for hydrogen production by electrolysis specifically includes: immersing a conducting substrate into a hydrothermal solution, mixing and stirring to form the nickel iron barium hydrotalcite; wherein, the hydrothermal solution is prepared by dissolving an alkaline-earth metal salt, a nickel salt and an iron salt as well as additional alkaline substances into water, and the amount of water is 35-50 mL; the rotation speed of the mixing and stirring is 800-1200 rpm.

From the above, it can be seen that the preferred hydrothermal method differs from the existing preparation process of a hydrothermal nickel iron hydrotalcite anode, for example, the concentrations of the barium salt, the nickel salt and the iron salt are different from the existing preparation process of the hydrothermal nickel iron hydrotalcite anode. This is a change made to form the above nano layer structure.

In one embodiment, the activation method of the anode for hydrogen production by electrolysis includes activating the anode for hydrogen production by electrolysis in the alkaline solution containing sulfate.

Specifically, the activation method of the anode for hydrogen production by electrolysis includes activating the anode for hydrogen production by electrolysis in the sulfate solution by using cyclic voltammetry. The solution used by cyclic voltammetry includes an alkaline substance and a sulfate salt, the alkaline substance includes sodium hydroxide or potassium hydroxide, and the sulfate salt can include sodium sulfate, but is not limited thereto. The concentration of the alkaline substance in the solution is 0.1-1 mol/L, and the concentration of sulfate salt is 0.01-0.1 mol/L.

The test system used in cyclic voltammetry can be a three-electrode system, the used pair electrode is a carbon rod, and the used reference electrode is a silver/silver chloride electrode; the ambient temperature used in cyclic voltammetry is 20-25° C., the used scanning cycles are 10-30 cycles, the used scanning voltage range is 0 V-1 V, and the used scanning voltage rate is 5 mV/s-50 mV/s.

To sum up, it can be seen that the above preferred activation method is a unique activation method in the present disclosure. The scanning voltage rate, scanning voltage range and electrode system are different from those in the existing anode activation processes. This is a change made to fix the above sulfate activating layer.

Some embodiments of the present disclosure also provide use of the catalyst for hydrogen production by electrolysis, the activated catalyst for hydrogen production by electrolysis or the anode for hydrogen production by electrolysis in hydrogen production by electrolysis.

In one embodiment, the use includes: placing the anode and cathode for hydrogen production by electrolysis into an aqueous solution containing chlorine ions, and applying a working voltage between the anode and the cathode.

Some embodiments of the present disclosure also provide use of the catalyst for hydrogen production by electrolysis in hydrogen production by electrolysis. The use includes: placing the anode and cathode for hydrogen production by electrolysis into an aqueous solution containing chlorine ions, and applying a working voltage between the anode and the cathode, thereby achieving hydrogen production by electrolysis; wherein, the anode includes the catalyst for hydrogen production by electrolysis.

Some embodiments of the present disclosure also provide a method for hydrogen production by electrolysis, including: placing the anode and cathode for hydrogen production by electrolysis into an aqueous solution containing chlorine ions, and applying a working voltage between the anode and the cathode, thereby achieving hydrogen production by electrolysis.

In one embodiment, the aqueous solution containing chlorine ions includes but is not limited to seawater or chlorine-containing industrial wastewater, etc. Preferably, the aqueous solution containing chlorine ions is alkaline.

By taking the aqueous solution containing chlorine ions being seawater as an example, the hydrogen evolution efficiency can be up to more than 0.27 L/h through the method for hydrogen production by electrolysis under the conditions that the temperature is 25° C., the voltage is 2 V, a distance between the anode and the cathode is 1 cm, and the surface area of the anode is 1 $cm^2$.

Some embodiments of the present disclosure also provide a system for hydrogen production by electrolysis, including an anode and a cathode. The system for hydrogen production by electrolysis is used for performing hydrogen production by electrolysis on the aqueous solution containing chlorine ions, and the anode includes the anode for hydrogen production by electrolysis.

In one embodiment, the aqueous solution containing chlorine ions includes but is not limited to seawater or chlorine-containing industrial wastewater, etc. In specific implementation, due to cost considerations, the optimal choice for the aqueous solution containing chloride ions is seawater.

In some cases, the system for hydrogen production by electrolysis can also include a power supply, etc. The cathode can select Pt, Ni, Raney Ni, NiMo alloy, etc.

The present disclosure provides a new thought for the stability of the anode in the process of producing hydrogen by electrolysis of seawater.

Next, the technical solution of the present disclosure will be further explained and illustrated through several embodiments in combination with drawings. However, the selected embodiments are only used for illustrating the present disclosure, but do not limit the scope of the present disclosure. Unless otherwise specified, the raw materials, detection reagents and detection equipment used in the following embodiments can be purchased from the market, and the detection methods used are also commonly used in the art. For example, the foam nickel used as follows is commercial foam nickel, which has been cleaned before use. The specific cleaning methods include: cutting commercial foam nickel into 1 cm×4 cm long strips, ultrasonic treatment in 2 mol·$L^{-1}$ hydrochloric acid solution for 3 min, ultrasonic cleaning in deionized water and non-aqueous ethanol for three times respectively, and then natural drying in air.

Example 1

(1) Nickel nitrate hexahydrate, barium nitrate, iron nitrate nonahydrate and hexamethylenetetraammonium were weighed and dissolved into 35 mL of deionized water in a molar ratio of 5:0.5:5:10 to prepare a solvothermal reaction solution containing nickel iron barium, and the solvothermal reaction solution was transferred to 50 mL of reaction tank made of a polytetrafluoroethylene material.

(2) Foam nickel was used as a conducting substrate, and the washed conducting substrate was immersed into the reaction solution to be sealed in a stainless steel autoclave to conduct solvothermal reaction for 48 h at 80° C., and the reaction solution was taken out after being cooled, then washed with ultrapure water and ethanol, placed in an oven and dried for 12 h at 60° C. in air, so as to obtain a high-stability NiFeBa/NF oxygen evolution anode (hereinafter called a NiFeBa/NF anode or an anode for hydrogen production by electrolysis for short).

(3) 20 g of sodium hydroxide and 146.1 g of sodium chloride were weighed and dissolved into 1 L of deionized water to prepare a low-alkali high-salt-concentration simulated seawater solution containing 0.5 M NaOH and 2.5 M NaCl.

(4) The stability of NiFeBa/NF was tested under the current density of 400 mA/cm$^2$ by using the NiFeBa/NF anode prepared in step (2) as a working electrode, a Pt sheet as a pair electrode and the low-alkali high-salt-concentration simulated seawater prepared in step (3) as an electrolyte.

As a control, barium nitrate in step (1) was omitted, the rest operations and process conditions were all the same as those in steps (1)-(2), and a NiFe-LDH/NF anode was finally prepared. The stability of the prepared anode was tested by using the same method as that in step (4).

The test results showed that the stability of the NiFe-LDH/NF anode prepared in this example in harsh simulated seawater electrolysis was maintained as about 2 h, while the NiFe-LDH/NF anode can only operate for 30 min in the same solution environment, indicating that the NiFe-LDH/NF anode prepared in this example takes the effect of protecting the conducting substrate.

Example 1-1

A preparation method of a NiFeBa/NF anode provided in this example is basically the same as that in example 1 only except that: the solvothermal reaction in step (2) was carried out for 12 h at a temperature of 90° C.

The stability of the NiFeBa/NF anode in this example was tested by using a method that was the same as that in example 1. The test results show that the stability of the NiFeBa/NF anode prepared in this example in harsh stimulated seawater electrolysis is maintained as about 3 h.

Example 2

(1) Nickel nitrate hexahydrate, barium nitrate, iron nitrate nonahydrate and urea were weighed and dissolved into 35 mL of deionized water in a molar ratio of 3:0.6:1:6 to prepare a solvothermal reaction solution containing nickel iron barium, and the solvothermal reaction solution was transferred to 50 mL of reaction tank made of a polytetrafluoroethylene material.

Figure 2:
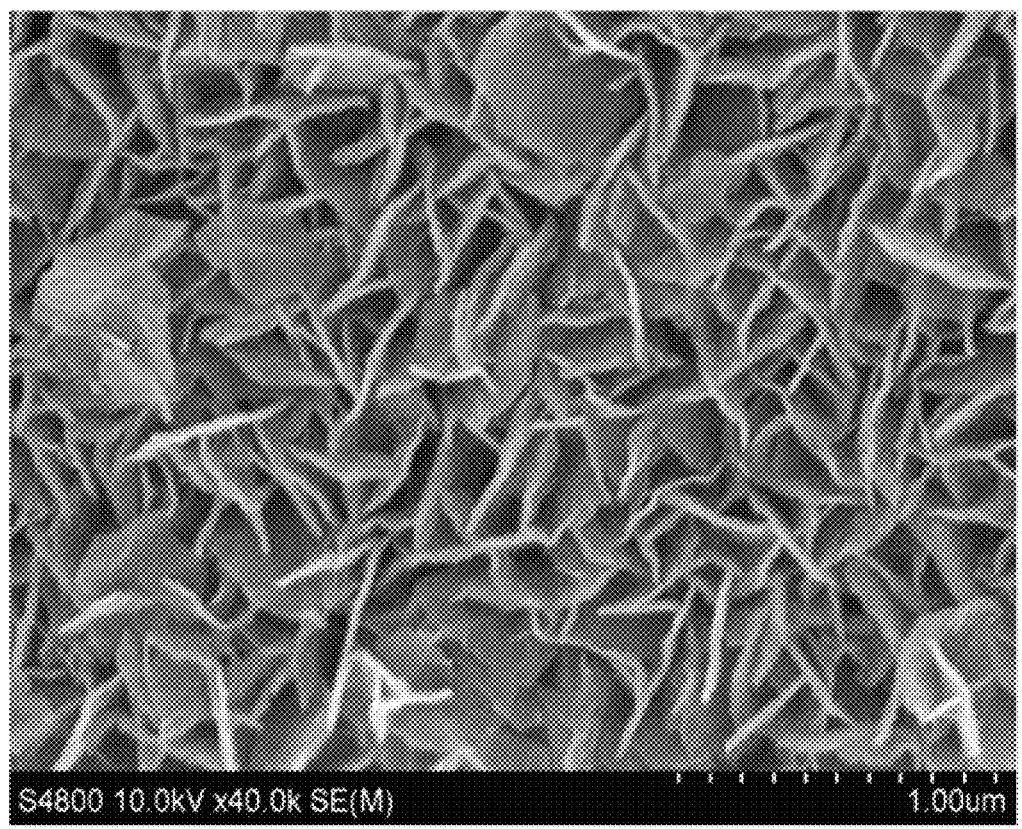
FIG. 2 is a surface morphology electron microscopy image of an anode for hydrogen production by electrolysis provided in example 2.
Figure 3:
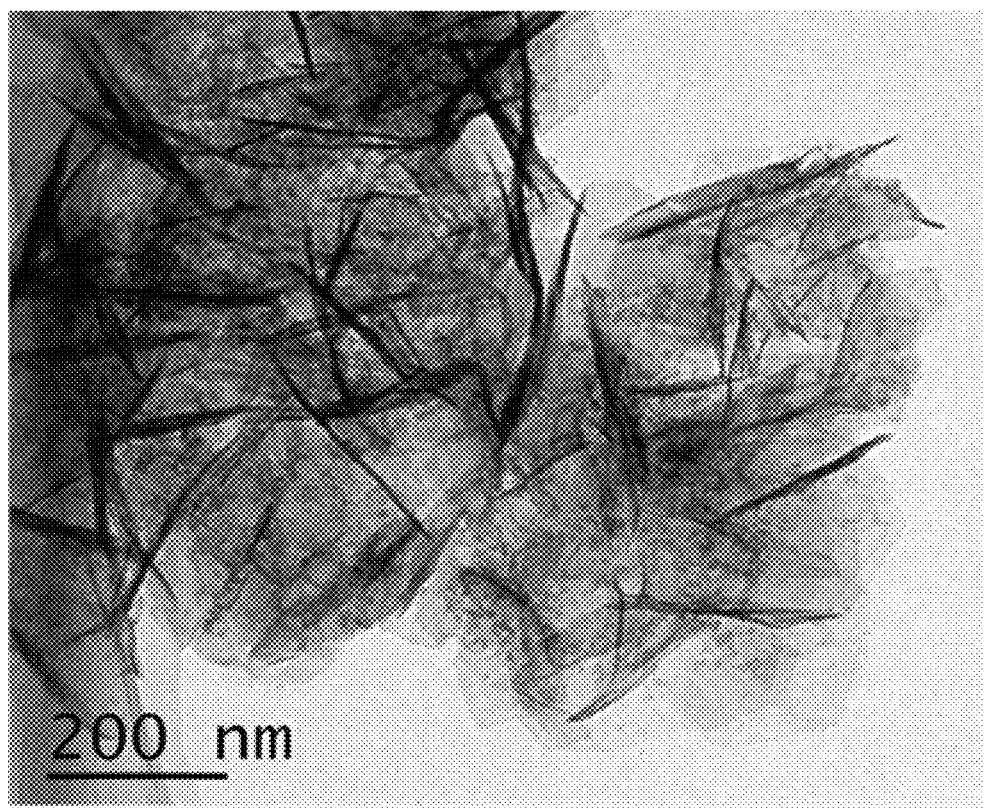
FIG. 3 is a scanning transmission electron microscopy image of an anode for hydrogen production by electrolysis provided in example 2.
Figure 4:
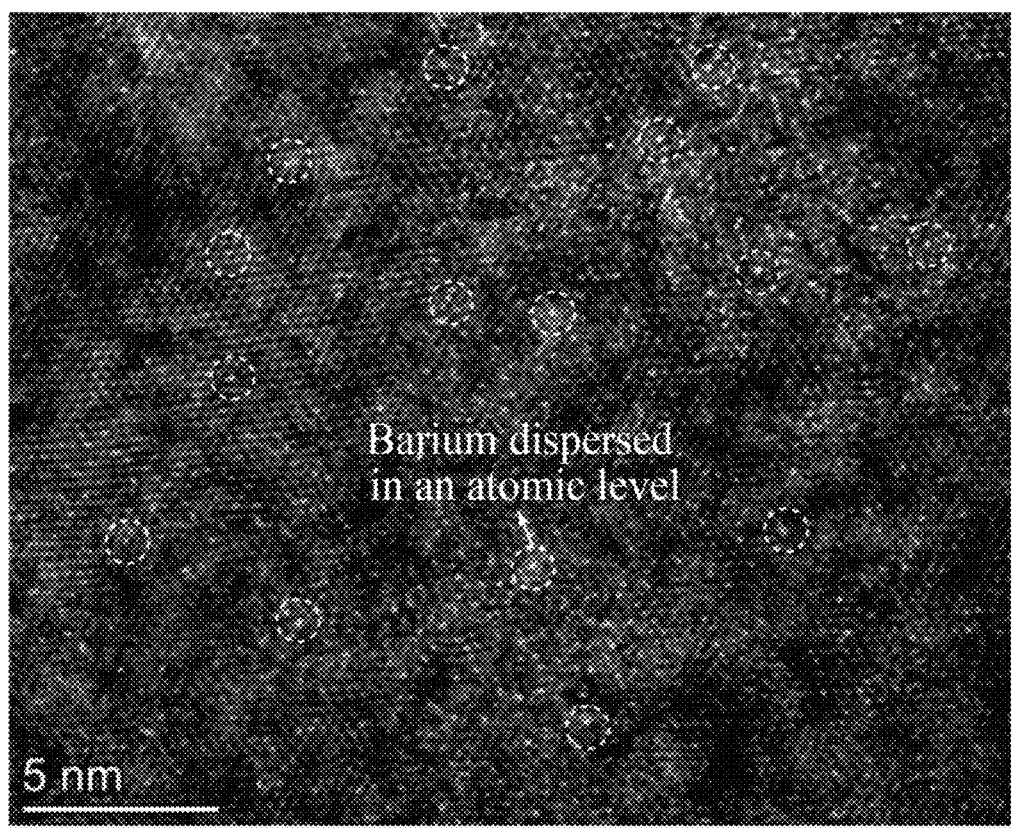
FIG. 4 is a spherical aberration transmission electron microscopy image of an anode for hydrogen production by electrolysis provided in example 2.
Figure 6:
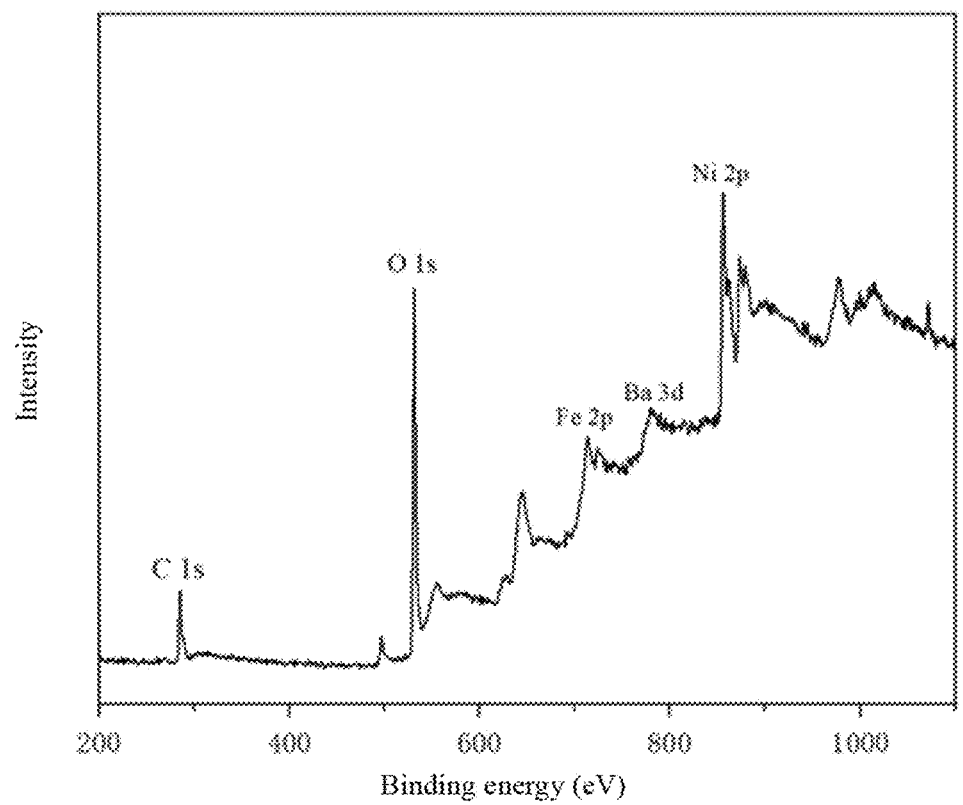
FIG. 6 is an X-ray photoelectron spectrogram of an anode for hydrogen production by electrolysis provided in example 4.

(2) Foam nickel was used as a conducting substrate, and the washed conducting substrate was immersed into the reaction solution to be sealed in a stainless steel autoclave to conduct solvothermal reaction for 4 h at 150° C., and the reaction solution was taken out after being cooled, then washed with ultrapure water and ethanol, placed in an oven and dried for 12 h at 60° C. in air, so as to obtain the NiFeBa/NF anode. The X-ray diffraction pattern of the NiFeBa/NF anode is as shown in FIG. 1, the surface morphology is as shown in FIG. 2, TEM is as shown in FIG. 3 and FIG. 4. It can be explicated that on the one hand, BiFeBa closely covers on the surface of the conducting substrate, and on the other hand, Ba is doped in nickel iron hydrotalcite in a form of atomic-level dispersion to form a brand-new anode nickel iron barium hydrotalcite, and an XPS image is as shown in FIG. 6.

(3) 40 g of sodium hydroxide and 146.1 g of sodium chloride solid were weighed and dissolved into 1 L of deionized water to prepare a simulated seawater solution containing 1 M NaOH and 2.5 M NaCl.

Figure 5:
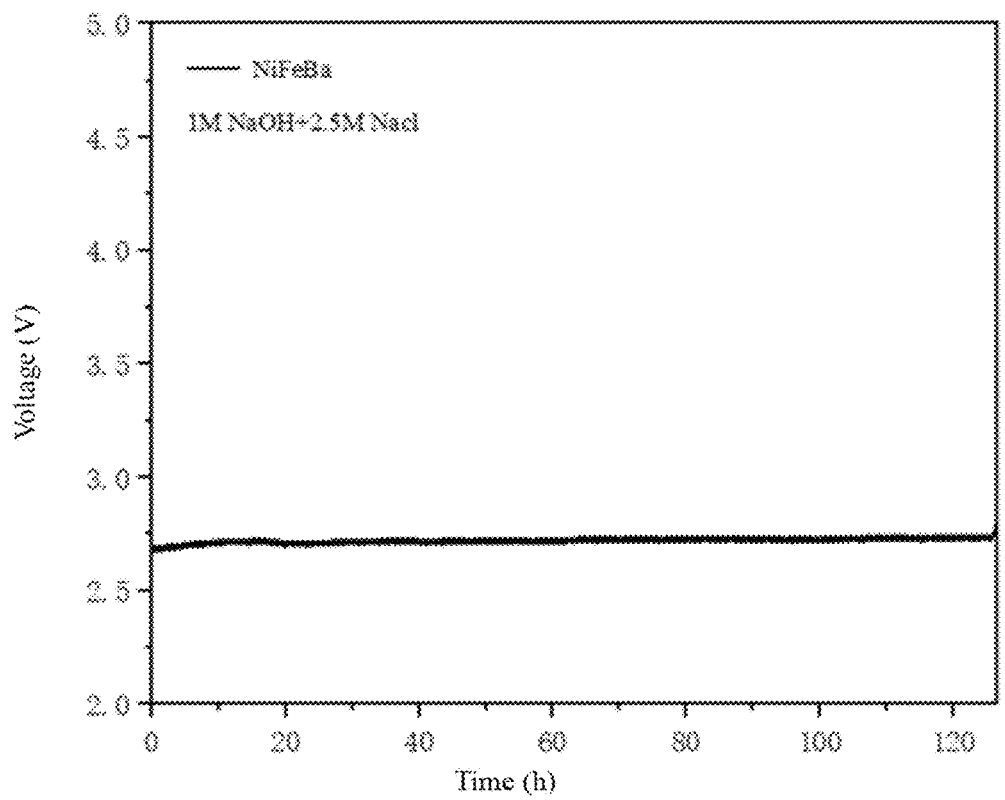
FIG. 5 is an electrolysis stability test graph of an anode for hydrogen production by electrolysis provided in example 2.

(4) The stability of the NiFeBa/NF anode was tested under the current density of 400 mA/cm$^2$ by using the NiFeBa/NF anode prepared in step (2) as a working electrode, a Pt sheet as a pair electrode and the high-concentration simulated seawater prepared in step (3) as an electrolyte. The results are as shown in FIG. 5.

As a control, barium nitrate in step (1) was omitted, the rest operations and process conditions were all the same as those in steps (1)-(2), and a NiFe-LDH/NF anode was finally prepared. The stability of the prepared anode was tested by using the same method as that in step (4).

The electrode prepared in this example can stably work for up to 120 h in stimulated seawater electrolysis, and the stability of this electrode was four times that of NiFe-LDH/NF. It shows that the NiFeBa/NF anode prepared in this example takes the effect of protecting the substrate.

Example 2-1

A preparation method of a NiFeBa/NF anode provided in this example is basically the same as that in example 2 only except that: the solvothermal reaction in step (2) was carried out for 4 h at a temperature of 120° C.

The stability of the NiFeBa/NF anode in this example was tested by using a method that was the same as that in example 2. The test results show that the stability of the NiFeBa/NF anode prepared in this example in stimulated seawater electrolysis is maintained as about 140 h.

Example 3

(1) Nickel nitrate hexahydrate, barium nitrate, iron nitrate nonahydrate and urea were weighed and dissolved into 35 mL of deionized water in a molar ratio of 3:1:3:10 to prepare a solvothermal reaction solution containing nickel iron barium, and the solvothermal reaction solution was transferred to 50 mL of reaction tank made of a polytetrafluoroethylene material.

(2) Foam nickel was used as a conducting substrate, and the washed conducting substrate was immersed into a reaction solution to be sealed in a stainless steel autoclave to conduct solvothermal reaction for 24 h at 120° C., and the reaction solution was taken out after being cooled, then washed with ultrapure water and ethanol, placed in an oven and dried for 12 h at 60° C. in air, so as to obtain a NiFeBa/NF anode.

(3) 20 g of sodium hydroxide, 146.1 g of sodium chloride and 35.51 g of absolute sodium sulfate solid were weighed and dissolved into 1 L of deionized water to prepare a high-concentration simulated seawater solution containing 0.5 M NaOH, 2.5 M NaCl and 0.25 M Na$_2$SO$_4$.

(4) The stability of NiFeBa/NF was tested under the current density of 400 mA/cm$^2$ by using the NiFeBa/NF anode prepared in step (2) as a working electrode, a Pt sheet as a pair electrode and the low-alkali high-salt-concentration simulated seawater prepared in step (3) as an electrolyte.

As a control, barium nitrate in step (1) was omitted, the rest operations and process conditions were all the same as those in steps (1)-(2), and a NiFe-LDH/NF anode was finally prepared. The stability of the prepared anode was tested by using the same method as that in step (4).

The electrode prepared in this example can stably work for up to 18 h in seawater electrolysis, and the stability of this electrode was about 8 times that of NiFe-LDH/NF, indicating that the NiFeBa/NF anode prepared in this example takes the effect of protecting the substrate.

Example 3-1

A preparation method of a NiFeBa/NF anode provided in this example is basically the same as that in example 2 only except that: the solvothermal reaction in step (2) was carried out for 4 h at a temperature of 120° C.

The stability of the NiFeBa/NF anode in this example was tested by using a method that was the same as that in example 3. The test results show that the stability of the NiFeBa/NF anode prepared in this example in stimulated seawater electrolysis was maintained as about 25 h.

Example 4

Figure 7:
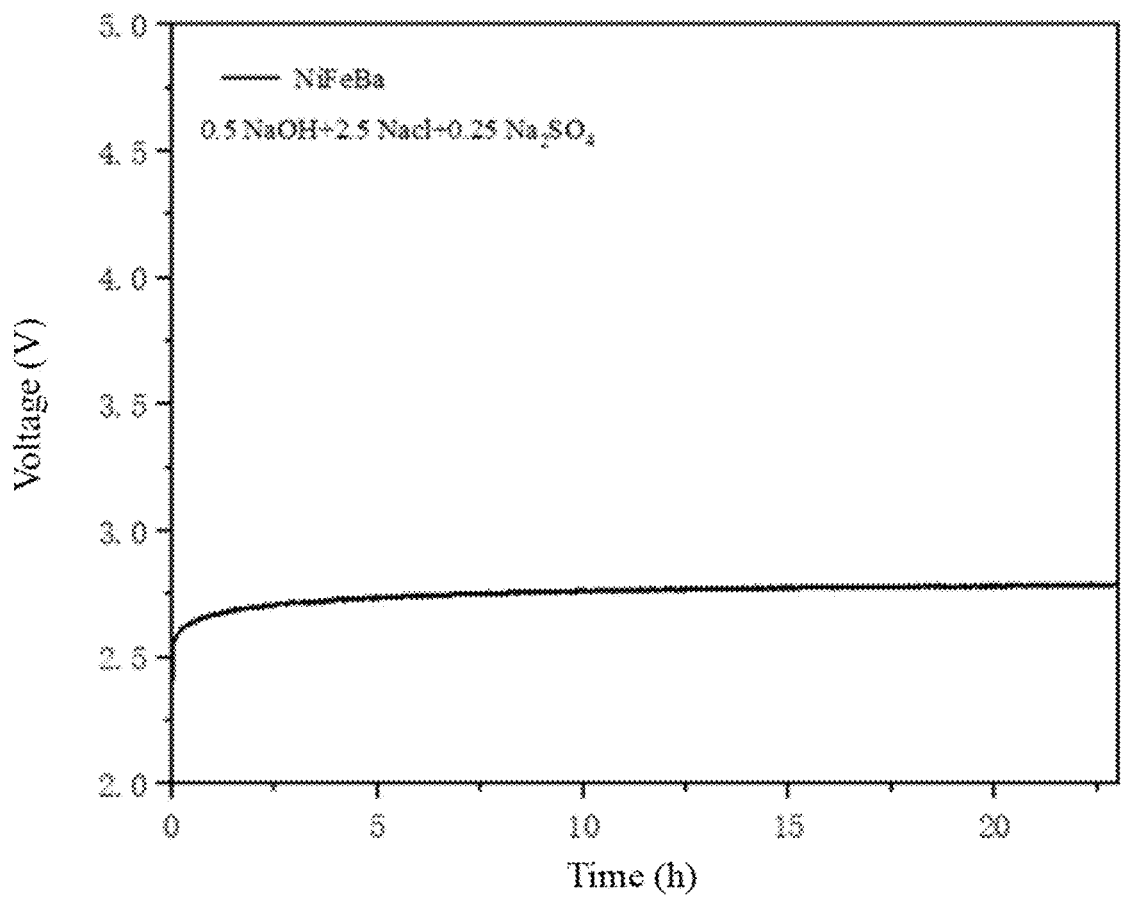
FIG. 7 is an electrolysis stability test graph of an anode for hydrogen production by electrolysis provided in example 5.

(1) Nickel nitrate hexahydrate, barium nitrate, iron nitrate nonahydrate and urea were weighed and dissolved into 35 mL of deionized water in a molar ratio of 5:0.5:5:10 to prepare a solvothermal reaction solution containing nickel iron barium, and the solvothermal reaction solution was transferred to 50 mL of reaction tank made of a polytetrafluoroethylene material.
(2) Foam nickel was used as a conducting substrate, and the washed conducting substrate was immersed into a reaction solution to be sealed in a stainless steel autoclave to conduct solvothermal reaction for 24 h at 120° C., and the reaction solution was taken out after being cooled, then washed with ultrapure water and ethanol, placed in an oven and dried for 12 h at 60° C. in air, so as to a high-stability NiFeBa/NF anode.
(3) 20 g of sodium hydroxide, 146.1 g of sodium chloride and 35.51 g of absolute sodium sulfate solid were weighed and dissolved into 1 L of deionized water to prepare a high-concentration simulated seawater solution containing 0.5 M NaOH, 2.5 M NaCl and 0.25 M $Na_2SO_4$.
(4) The stability of NiFeBa/NF was tested under the current density of 400 $mA/cm^2$ by using the NiFeBa/NF anode prepared in step (2) as a working electrode, a Pt sheet as a pair electrode and the low-alkali high-salt-concentration simulated seawater prepared in step (3) as an electrolyte. The results are as shown in FIG. 7.

As a control, barium nitrate in step (1) was omitted, the rest operations and process conditions were all the same as those in steps (1)-(2), and a NiFe-LDH/NF anode was finally prepared. The stability of the prepared anode was tested by using the same method as that in step (4).

The NiFeBa/NF anode prepared in this example can stably work for up to 20 h in seawater electrolysis, the stability of the NiFeBa/NF anode is about seven times that of NiFe-LDH/NF, indicating that the NiFeBa/NF anode prepared in this example takes the effect of protecting the substrate.

It can be seen based on the above example that in a proper barium nitrate concentration range, the stability of the prepared NiFeBa/NF anode is significantly improved compared with that of NiFe-LDH/NF.

Example 5

Figure 8:
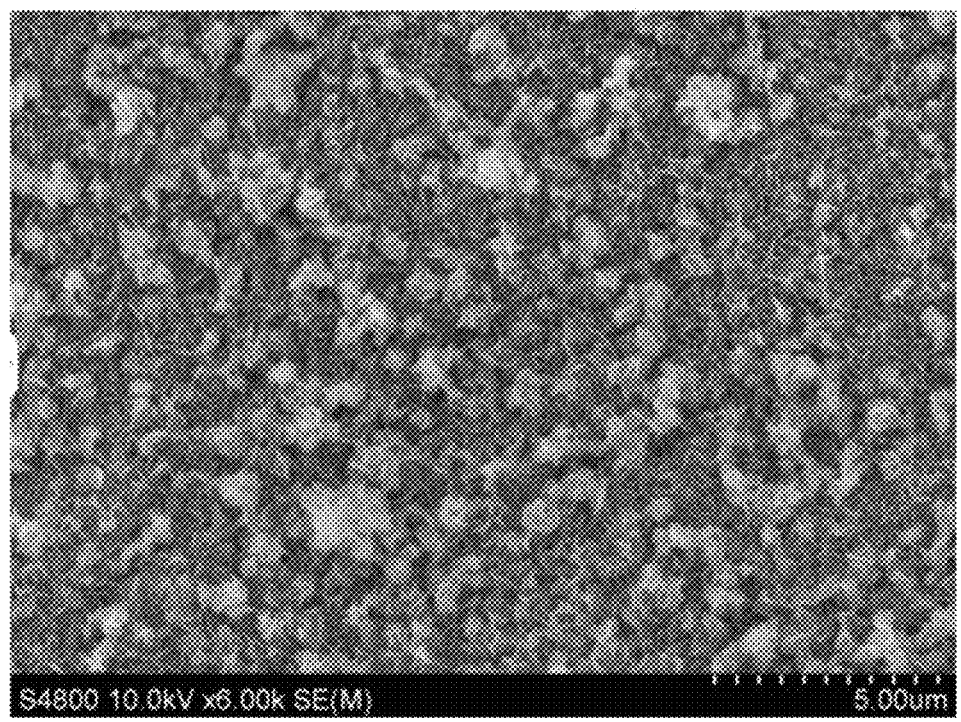
FIG. 8 is a surface morphology electron microscopy image of an anode for hydrogen production by electrolysis provided in example 5.
Figure 9:
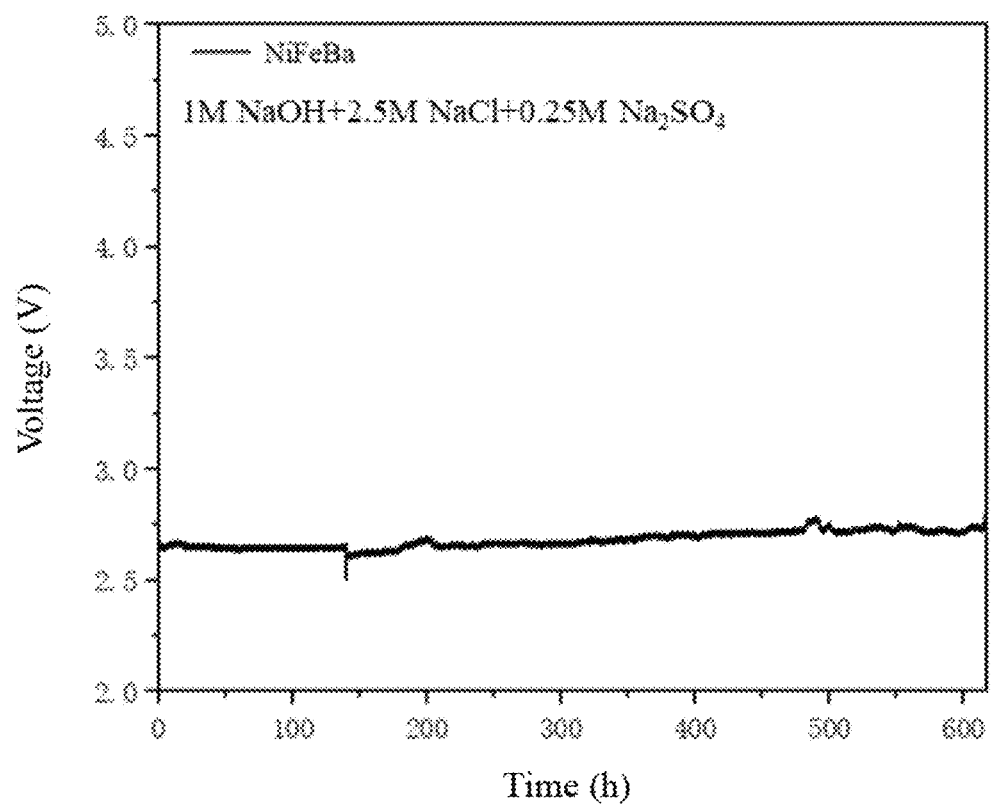
FIG. 9 is an electrolysis stability test graph of an anode for hydrogen production by electrolysis provided in example 5.

(1) Nickel nitrate hexahydrate, barium nitrate, iron nitrate nonahydrate and urea were weighed and dissolved into 35 mL of deionized water in a molar ratio of 4:1:4:8 to prepare a solvothermal reaction solution containing nickel iron barium, and the solvothermal reaction solution was transferred to 50 mL of reaction tank made of a polytetrafluoroethylene material.
(2) Foam nickel was used as a conducting substrate, and the washed conducting substrate was immersed into the reaction solution to be sealed in a stainless steel autoclave to conduct solvothermal reaction for 4 h at 150° C., and the reaction solution was taken out after being cooled, then washed with ultrapure water and ethanol, placed in an oven and dried for 12 h at 60° C. in air, so as to obtain a high-stability NiFeBa/NF anode. The scanning image is as shown in FIG. 8, from which it can be seen that NiFeBa/NF closely covers on the surface of the conducting substrate.
(3) 40 g of sodium hydroxide, 146.1 g of sodium chloride and 35.51 g of absolute sodium sulfate were weighed and dissolved into 1 L of deionized water to prepare a high concentration simulated seawater solution containing 1 M NaOH, 2.5 M NaCl and 0.25 $Na_2SO_4$ M.
(4) The stability of NiFeBa/NF was tested under the current density of 400 $mA/cm^2$ by using the NiFeBa/NF anode prepared in step (2) as a working electrode, a Pt sheet as a pair electrode and the high-concentration simulated seawater prepared in step (3) as an electrolyte. The results are as shown in FIG. 9.

As a control, barium nitrate in step (1) was omitted, the rest operations and process conditions were all the same as those in steps (1)-(2), and a NiFe-LDH/NF anode was finally prepared. The stability of the NiFe-LDH/NF anode was tested by using the same method as that in step (4).

The NiFeBa/NF anode prepared in this example can stably work for up to over 600 h in seawater electrolysis, while the NiFe-LDH/NF anode can only work for 60 h, indicating that the NiFeBa/NF anode prepared in this example takes the effect of protecting the substrate.

Example 5-1

A preparation method of a NiFeBa/NF anode provided in this example is basically the same as that in example 2 only except that: the solvothermal reaction in step (2) was carried out for 4 h at a temperature of 100° C.

The stability of the NiFeBa/NF anode in this example was tested by using a method that was the same as that in example 5. The test results showed that the stability of the NiFeBa/NF anode prepared in this example in stimulated seawater electrolysis was maintained as about 630 h.

Example 5-2

A preparation method of a NiFeCa/NF anode provided in this example is basically the same as that in example 5 only except that barium nitrate used in step (1) was replaced with calcium nitrate.

The stability of the NiFeCa/NF anode was tested by using a method that was the same as that in example 5. The test results showed that the stability of the NiFeCa/NF anode prepared in this example in stimulated seawater electrolysis was maintained as about 530 h.

Example 5-3

A preparation method of a NiFeSr/NF anode provided in this example is basically the same as that in example 5 only except that barium nitrate used in step (1) was replaced with strontium nitrate.

The stability of the NiFeSr/NF anode was tested by using a method that was the same as that in example 5. The test results showed that the stability of the NiFeSr/NF anode prepared in this example in stimulated seawater electrolysis was maintained as about 560 h.

Example 6

(1) Nickel nitrate hexahydrate, barium nitrate, iron nitrate nonahydrate and urea were weighed and dissolved into 35 mL of deionized water in a molar ratio of 4:0.4:4:6 to prepare a solvothermal reaction solution containing nickel iron barium, and the solvothermal reaction solution was transferred to 50 mL of reaction tank made of a polytetrafluoroethylene material.

(2) Foam nickel was used as a conducting substrate, and the washed conducting substrate was immersed into a reaction solution to be sealed in a stainless steel autoclave to conduct solvothermal reaction for 48 h at 80° C., and the reaction solution was taken out after being cooled, then washed with ultrapure water and ethanol, placed in an oven and dried for 12 h at 60° C. in air, so as to a high-stability NiFeBa/NF anode.

(3) 40 g of sodium hydroxide and 29.22 g of sodium chloride solid were weighed and dissolved into 1 L of deionized water to prepare a simulated seawater solution containing 1 M NaOH and 0.5 M NaCl.

Figure 10:
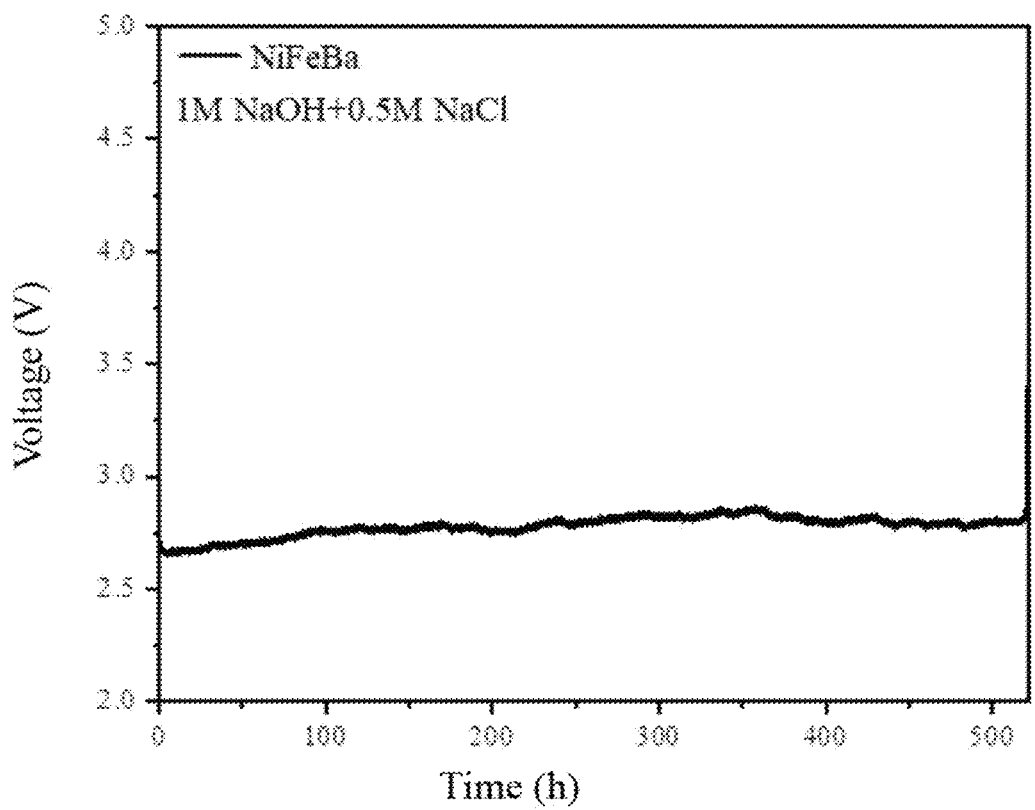
FIG. 10 is an electrolysis stability test graph of an anode for hydrogen production by electrolysis provided in example 6.

(4) The stability of NiFeBa/NF was tested under the current density of 400 mA/cm$^2$ by using the NiFeBa/NF anode prepared in step (2) as a working electrode, a Pt sheet as a pair electrode and the simulated seawater prepared in step (3) as an electrolyte. The results are as shown in FIG. 10.

As a control, barium nitrate in step (1) was omitted, the rest operations and process conditions were all the same as those in steps (1)-(2), and a NiFe-LDH/NF anode was finally prepared. The stability of the prepared anode was tested by using the same method as that in step (4).

The NiFeBa/NF anode prepared in this example can stably work for up to 500 h in seawater electrolysis, the stability of the NiFeBa/NF anode was about twice that of NiFe-LDH/NF, indicating that the substrate protecting effect of the NiFeBa/NF anode prepared in this example is improved to a certain extent without the addition of sulfate.

Example 6-1

A preparation method of a NiFeBa/NF anode provided in this example is basically the same as that in example 2 only except that: the solvothermal reaction in step (2) was carried out for 12 h at a temperature of 90° C.

The stability of the NiFeBa/NF anode in this example was tested by using a method that was the same as that in example 6. The test results showed that the stability of the NiFeBa/NF anode prepared in this example in stimulated seawater electrolysis was maintained as about 550 h.

Example 7

(1) Nickel nitrate hexahydrate, barium nitrate, iron nitrate nonahydrate and urea were weighed and dissolved into 35 mL of deionized water in a molar ratio of 5:1:1.5:10 to prepare a solvothermal reaction solution containing nickel iron barium, and the solvothermal reaction solution was transferred to 50 mL of reaction tank made of a polytetrafluoroethylene material.

(2) Foam nickel was used as a conducting substrate, and the washed conducting substrate was immersed into a reaction solution to be sealed in a stainless steel autoclave to conduct solvothermal reaction for 24 h at 120° C., and the reaction solution was taken out after being cooled, then washed with ultrapure water and ethanol, placed in an oven and dried for 12 h at 60° C. in air, so as to a high-stability NiFeBa/NF anode.

(3) 40 g of sodium hydroxide, 29.22 g of sodium chloride and 7.1 g of sodium sulfate solid were weighed and dissolved into 1 L of deionized water to prepare a simulated seawater solution containing 1 M NaOH, 0.5 M NaCl and 0.05 M $Na_2SO_4$.

Figure 11:
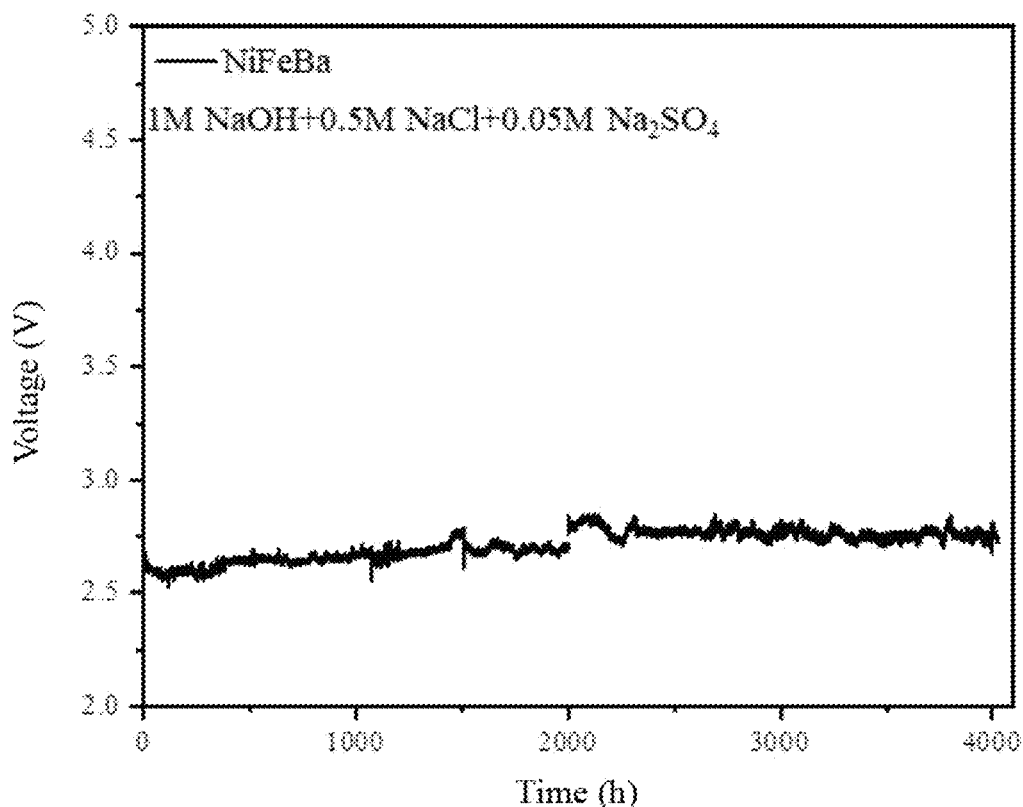
FIG. 11 is an electrolysis stability test graph of an anode for hydrogen production by electrolysis provided in example 7.

(4) The stability of NiFeBa/NF anode was tested under the current density of 400 mA/cm$^2$ by using the NiFeBa/NF anode prepared in step (2) as a working electrode, a Pt sheet as a pair electrode and the simulated seawater prepared in step (3) as an electrolyte. The results are as shown in FIG. 11.

As a control, barium nitrate in step (1) was omitted, the rest operations and process conditions were all the same as those in steps (1)-(2), and a NiFe-LDH/NF anode was finally prepared. The stability of the prepared anode was tested by using the same method as that in step (4).

The NiFeBa/NF anode prepared in this example has stably worked for 4000 h in seawater electrolysis. At present, the stability of the NiFeBa/NF anode is about 3 times that of NiFe-LDH/NF, indicating that the NiFeBa/NF anode prepared in this example has excellent stability.

Example 8

(1) Nickel nitrate hexahydrate, barium nitrate, iron nitrate nonahydrate and urea were weighed and dissolved into 35 mL of deionized water in a molar ratio of 2:0.6:2:6 to prepare a solvothermal reaction solution containing nickel iron barium, and the solvothermal reaction solution was transferred to 50 mL of reaction tank made of a polytetrafluoroethylene material.

(2) Foam nickel was used as a conducting substrate, and the washed conducting substrate was immersed into the reaction solution to be sealed in a stainless steel autoclave to conduct solvothermal reaction for 24 h at 120° C., and the reaction solution was taken out after being cooled, then washed with ultrapure water and ethanol, placed in an oven and dried for 12 h at 60° C. in air, so as to obtain the high-stability NiFeBa/NF.

(3) 40 g of sodium hydroxide and 142.04 g of absolute sodium sulfate solid were weighed and dissolved into 1 L of deionized water to prepare an electrolyte solution containing 1 M NaOH and 1 M $Na_2SO_4$ for later use. The NiFeBa/NF anode was activated for 1 h under the current density of 400 mA/cm$^2$ by using the NiFeBa/NF anode prepared in step (2) as a working electrode, a Pt sheet as a pair electrode and the electrolyte solution containing 1 M NaOH and 1M $Na_2SO_4$ to obtain the activated NiFeBa/NF anode.

(4) 40 g of sodium hydroxide and 146.1 g of sodium hydroxide solid were weighed and dissolved into 1 L of deionized water to prepare a high-concentration simulated seawater solution containing 1 M NaOH and 2.5 M NaCl.

Figure 12:
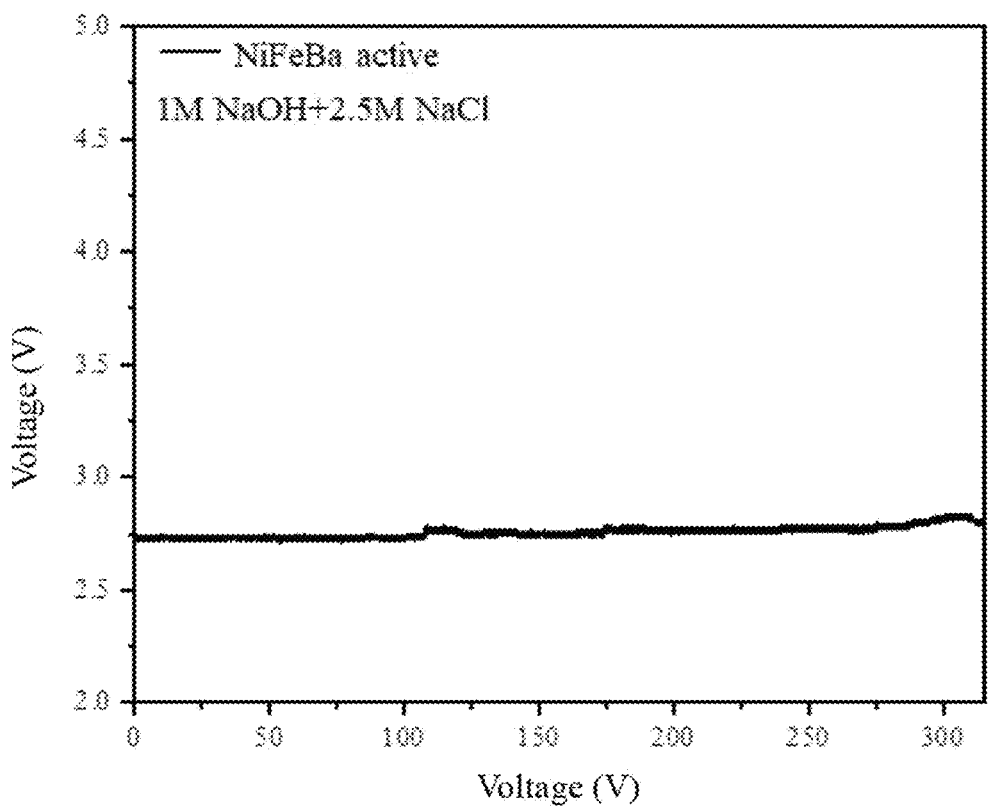
FIG. 12 is an electrolysis stability test graph of an anode for hydrogen production by electrolysis provided in example 8.

(5) The stability of NiFeBa/NF anode was tested under the current density of 400 mA/cm$^2$ by using the activated NiFeBa/NF anode prepared in step (3) as a working electrode, a Pt sheet as a pair electrode and the high-concentration simulated seawater prepared in step (4) as an electrolyte. The results are as shown in FIG. 12.

The activated NiFeBa/NF anode prepared in this example can stably work for up to 310 h in seawater electrolysis, while the NiFe-LDH/NF anode can only work for 30 h, indicating that the activated NiFeBa/NF anode prepared in this example takes the effect of protecting the substrate.

As a control, if the step (3) was omitted and test in step (5) was directly performed on the NiFeBa/NF anode in step (2). The results showed that without the activation, the activated NiFeBa/NF anode prepared in this example stably worked for 30 h in a high-concentration stimulated seawater solution containing 1 M NaOH and 2.5M NaCl.

Comparative Example 1

Figure 13:
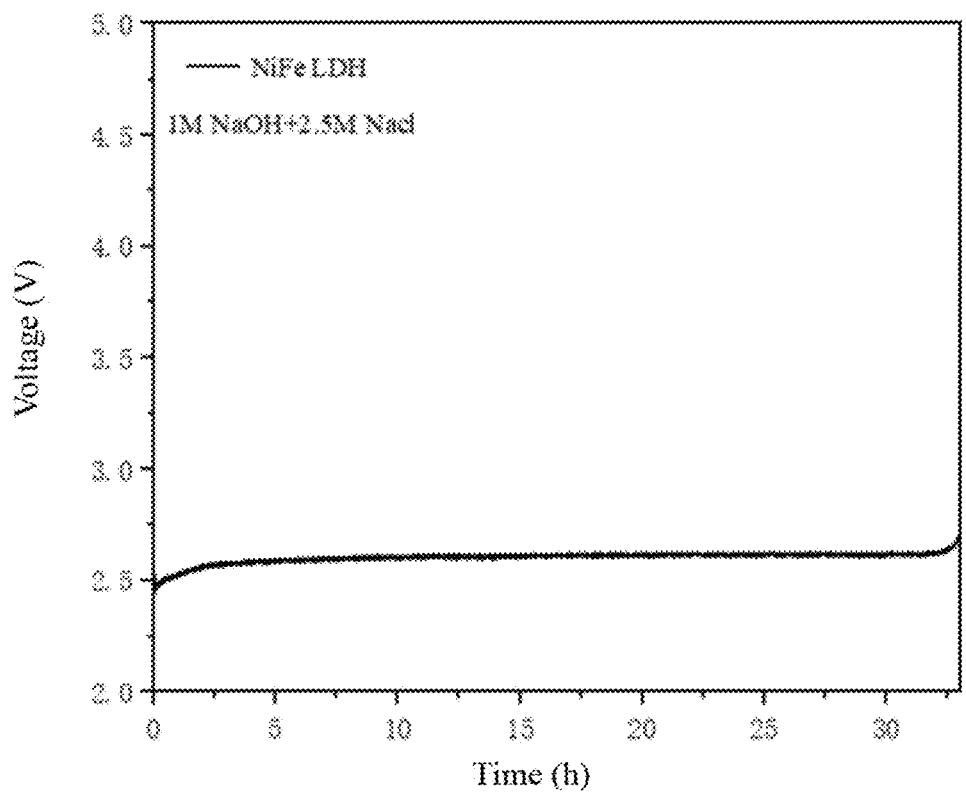
FIG. 13 is an electrolysis stability test graph of an anode for hydrogen production by electrolysis provided in comparative example 1.

(1) Nickel nitrate hexahydrate, iron nitrate nonahydrate and urea were weighed and dissolved into 35 mL of deionized water in a molar ratio of 5:5:10 to prepare a solvothermal reaction solution containing nickel iron, and the solvothermal reaction solution was transferred to 50 mL of reaction tank made of a polytetrafluoroethylene material.
(2) Foam nickel was used as a conducting substrate, and the washed conducting substrate was immersed into a reaction solution to be sealed in a stainless steel autoclave to conduct solvothermal reaction for 24 h at 120° C., and the reaction solution was taken out after being cooled, then washed with ultrapure water and ethanol, placed in an oven and dried for 12 h at 60° C. in air, so as to obtain a NiFe-LDH/NF anode.
(3) 40 g of sodium hydroxide and 146.1 g of sodium chloride solid were weighed and dissolved into 1 L of deionized water to prepare a simulated seawater solution containing 1 M NaOH and 2.5 M NaCl.
(4) The stability of NiFe-LDH/NF was tested under the current density of 400 mA/cm$^2$ by using the NiFe-LDH/NF prepared in step (2) as a working electrode, as Pt sheet as a pair electrode and the simulated seawater prepared in step (3) as an electrolyte. The results are as shown in FIG. 13. The NiFe-LDH/NF anode prepared in this comparative example can stably work for about 30 h, the activity of the NiFe-LDH/NF anode is basically the same as that of the NiFeBa/NF anode as a control, but the stability of the NiFe-LDH/NF anode is relatively poor.

The NiFeBa/NF anode as a control was prepared according to a method that is basically the same as that in example 4 only except the hydrothermal reaction temperature is 120° C.

Comparative Example 2

Figure 14:
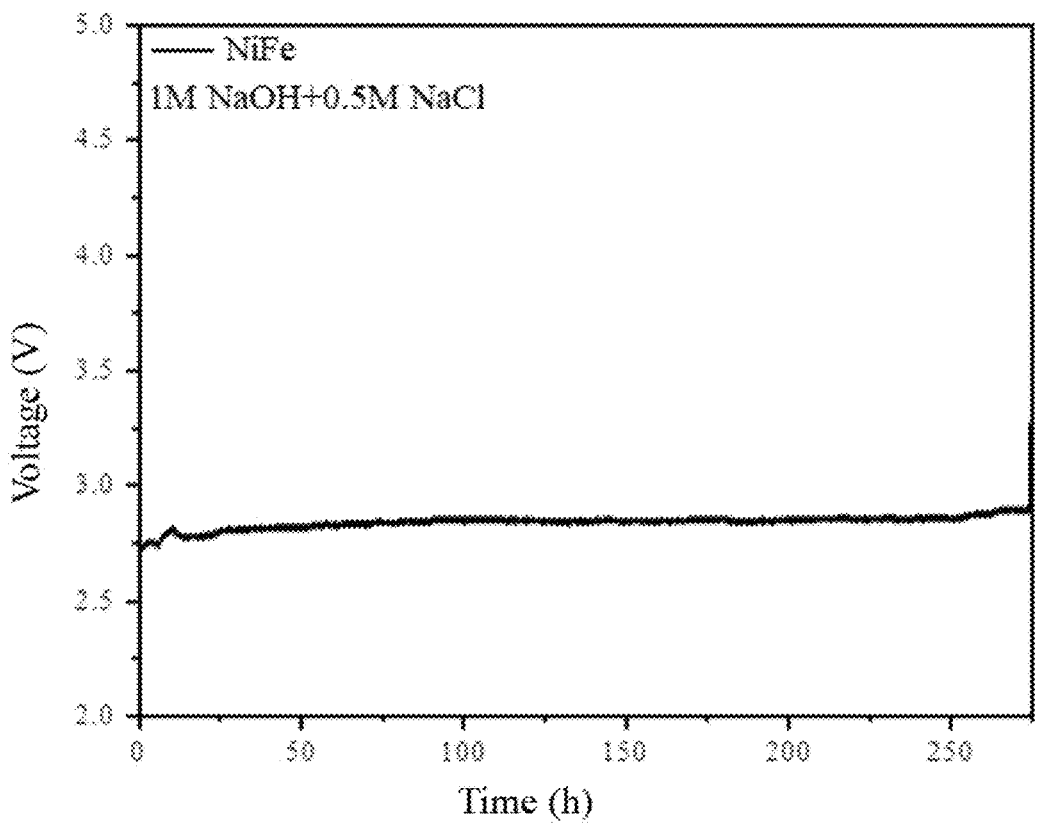
FIG. 14 is an electrolysis stability test graph of an anode for hydrogen production by electrolysis provided in comparative example 2.

(1) Nickel nitrate hexahydrate, iron nitrate nonahydrate and urea were weighed and dissolved into 35 mL of deionized water in a molar ratio of 5:5:10 to prepare a solvothermal reaction solution containing nickel iron, and the solvothermal reaction solution was transferred to 50 mL of reaction tank made of a polytetrafluoroethylene material.
(2) Foam nickel was used as a conducting substrate, and the washed conducting substrate was immersed into a reaction solution to be sealed in a stainless steel autoclave to conduct solvothermal reaction for 4 h at 150° C., and the reaction solution was taken out after being cooled, then washed with ultrapure water and ethanol, placed in an oven and dried for 12 h at 60° C. in air, so as to obtain a NiFe-LDH/NF anode.
(3) 40 g of sodium hydroxide and 29.22 g of sodium chloride solid were weighed and dissolved into 1 L of deionized water to prepare a simulated seawater solution containing 1 M NaOH and 0.5 M NaCl.
(4) The stability of NiFe-LDH/NF was tested under the current density of 400 mA/cm$^2$ by using the NiFe-LDH/NF anode prepared in step (5) as a working electrode, as Pt sheet as a pair electrode and the simulated seawater prepared in step (3) as an electrolyte. The results are as shown in FIG. 14. The NiFe-LDH/NF anode prepared in this comparative example can stably work for about 230 h, with poor stability, which is far lower than that of the NiFeBa/NF anode in example 4.

Comparative Example 3

Figure 15:
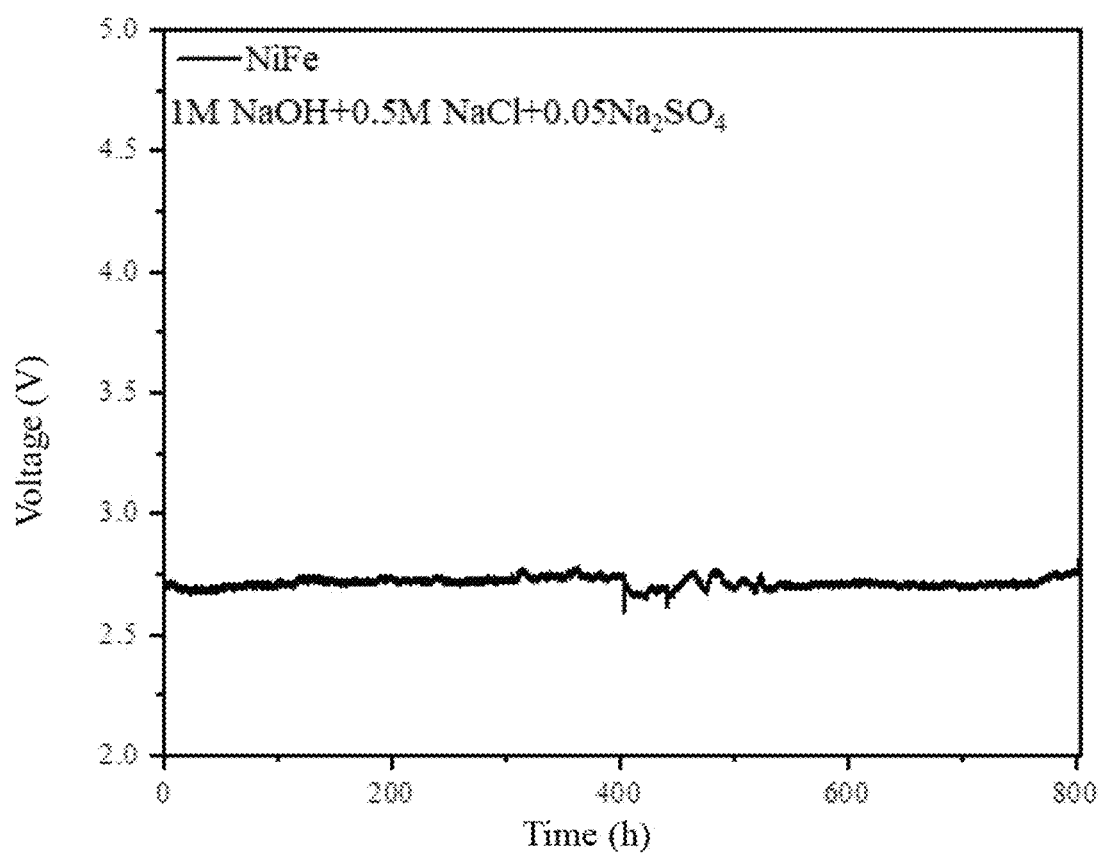
FIG. 15 is an electrolysis stability test graph of an anode for hydrogen production by electrolysis provided in comparative example 3.

(1) Nickel nitrate hexahydrate, iron nitrate nonahydrate and urea were weighed and dissolved into 35 mL of deionized water in a molar ratio of 5:5:10 to prepare a solvothermal reaction solution containing nickel iron, and the solvothermal reaction solution was transferred to 50 mL of reaction tank made of a polytetrafluoroethylene material.
(2) Foam nickel was used as a conducting substrate, and the washed conducting substrate was immersed into a reaction solution to be sealed in a stainless steel autoclave to conduct solvothermal reaction for 48 h at 90° C., and the reaction solution was taken out after being cooled, then washed with ultrapure water and ethanol, placed in an oven and dried for 12 h at 60° C. in air to obtain a NiFeBa/NF anode.
(3) 40 g of sodium hydroxide, 29.22 g of sodium chloride and 7.1 g of sodium sulfate solid were weighed and dissolved into 1 L of deionized water to prepare a simulated seawater solution containing 1 M NaOH, 0.5 M NaCl and 0.05 M $Na_2SO_4$.
(4) The stability of NiFe-LDH/NF anode was tested under the current density of 400 mA/cm$^2$ by using the NiFe-LDH/NF anode prepared in step (2) as a working electrode, as Pt sheet as a pair electrode and the simulated seawater prepared in step (3) as an electrolyte. The results are as shown in FIG. 15. The NiFe-LDH/NF anode prepared in this comparative example can stably work for about 800 h, with poor stability, which is far lower than that of the NiFeBa/NF anode prepared in example 4.

Under the conditions that the temperature was 25° C., the voltage was 2 V, a distance between the anode and a cathode was 1 cm and the surface area of the anode was 1 cm$^2$, the anodes in example 1-example 8 were respectively utilized to electrolyze the stimulated seawater in example 7 to produce hydrogen. The hydrogen evolution efficiencies were respectively 0.272, 0.268, 0.271, 0.265, 0.267, 0.270, 0.273 and 0.266 L/h. However, under the same conditions, the anodes in comparative example 1-comparative example 3 were respectively utilized to electrolyze the stimulated seawater in example 1 to produce hydrogen. The hydrogen evolution efficiencies were respectively 0.257, 0.251 and 0.254 L/h.

In addition, the inventor also used a commercial nickel network, commercial foam iron and commercial foam nickel iron as conducting substrates to replace foam nickel in example 1-example 8 to prepare NiFeBa/NF anodes, and the stability and electrolytic hydrogen production efficiency of these NiFeBa/NF anodes were tested according to the methods that were the same as those in example 1-example 8. The test results show these NiFeBa/NF anodes exhibit excellent stability and relatively high electrolytic hydrogen production electrolysis efficiency.

Example 9 A preparation method of a NiFeCa/NF anode is basically the same as that in example 3 only except that barium nitrate was replaced with calcium nitrate.

Example 9-1 A preparation method of a NiFeCa/NF anode is basically the same as that in example 3-1 only except that barium nitrate was replaced with calcium nitrate.

Example 10 A preparation method of a NiFeSr/NF anode is basically the same as that in example 3 only except that barium nitrate was replaced with strontium nitrate.

Example 10-1 A preparation method of a NiFeSr/NF anode is basically the same as that in example 3-1 only except that barium nitrate was replaced with strontium nitrate.

Performance test was performed on the anodes in example 9, example 9-1, example 10 and example 10-1 by referring to the methods in example 3 and example 3-1. The results are seen in Table 1.

TABLE 1

Performance test results of anodes in example 9, example 9-1, example 10 and example 10-1

| Example | Test environment | Stability |
|---|---|---|
| 9 | 0.5M NaOH + 2.5M NaCl + 0.25M Na$_2$SO$_4$ | 13 h |
| 9-1 | 0.5M NaOH + 2.5M NaCl + 0.25M Na$_2$SO$_4$ | 20 h |
| 10 | 0.5M NaOH + 2.5M NaCl + 0.25M Na$_2$SO$_4$ | 16 h |
| 10-1 | 0.5M NaOH + 2.5M NaCl + 0.25M Na$_2$SO$_4$ | 22 h |

Based on the above examples, it can be seen that the catalyst for hydrogen production by electrolysis provided in the present disclosure enables the surface of the anode for hydrogen production by electrolysis to have higher resistance to chloride ions, which can significantly delay the corrosion of the conductive substrate and catalyst by chloride ions in seawater electrolysis, and thus enable the anode to have excellent stability in the electrolysis hydrogen production process of chlorine-containing aqueous solutions, especially in the hydrogen production by electrolysis reaction in seawater.

In the above examples of the present disclosure, the NiFeBa/NF, NiFeCa/NF, NiFeSr/NF oxygen evolution catalysts and the like densely coated on the conducting substrate were prepared by a simple hydrothermal method, non-precious metals were used as a catalyst metal source with the advantage of low cost, and the service life of the anode for hydrogen production by electrolysis was significantly prolonged.

It should be understood that the above embodiments are only for illustrating the technical concept and characteristics of the present disclosure, and their purpose is to enable those familiar with this technology to understand the content of the present disclosure and implement it accordingly, and cannot limit the scope of protection of the present disclosure. Any equivalent changes or modifications made based on the essence of the present disclosure shall be covered within the scope of protection of the present disclosure.

What is claimed is:

1. A catalyst for hydrogen production by electrolysis, wherein a chemical formula of the catalyst is $[M_{1-x}N_xM'(OH)_2]^{x+}[(A^{n-})_{x/n}\cdot mH_2O]^{x-}$, M and N are any two of scandium, vanadium, chromium, manganese, iron, cobalt, and nickel ions, and M and N are respectively +2 and +3 valent, M' is selected from alkaline-earth metal ions and dispersed in the catalyst in an atomic level, $A^{n-}$ is selected from $CO_3^{2-}$, $NO_3^{2-}$, $Cl^-$, $OH^-$, or $SO_4^{2-}$, x=0.17-0.33, m is an integer of more than or equal to 0, and n is 1-3.

2. The catalyst for hydrogen production by electrolysis according to claim 1, wherein the catalyst has at least one of the following features:
   i) M and N are any two of iron, cobalt, and nickel ions;
   ii) M' is selected from $Ca^{2+}$, $Sr^{2+}$, or $Ba^{2+}$;
   iii) $A^{n-}$ is selected from $CO_3^{2-}$, $NO_3^{2-}$, $OH^-$, or $SO_4^{2-}$;
   iv) an atomic percentage content of M' in the catalyst is 0.4%-0.5%; and
   the catalyst has a nano hexagonal sheet structure, the nano hexagonal sheet structure has at least one of the following features: a) a thickness is 100-200 nm; b) an area is 0.01-0.05 μm$^2$.

3. An activation method of the catalyst for hydrogen production by electrolysis according to claim 1, comprising: placing the catalyst in an alkaline solution containing sulfate ions, wherein a pH value of the alkaline solution is 13-14, and activating the catalyst using an electrochemical method.

4. The activation method according to claim 3, wherein the electrochemical method comprises one of cyclic voltammetry, linear sweep voltammetry, and a constant-current charge-discharge method, or a combination thereof; wherein in the cyclic voltammetry method, a used scanning voltage is 0 V-1 V, a scanning voltage speed is 5 mV/s-50 mV/s, scanning cycles are 10-30 cycles, and a scanning ambient temperature is room temperature; and
   the alkaline solution contains a sulfate salt with a concentration of 0.01-0.1 mol/L, and the sulfate salt comprises sodium sulfate or potassium sulfate; or
   the alkaline solution contains an alkaline substance with a concentration of 0.1-1 mol/L, and the alkaline substance comprises sodium hydroxide or potassium hydroxide.

5. The activation method according to claim 3, wherein the catalyst has at least one of the following features:
   i) M and N are any two of iron, cobalt, and nickel ions;
   ii) M' is selected from $Ca^{2+}$, $Sr^{2+}$, or $Ba^{2+}$;
   iii) $A^{n-}$ is selected from $CO_3^{2-}$, $NO_3^{2-}$, $OH^-$, or $SO_4^{2-}$;
   iv) an atomic percentage content of M' in the catalyst is 0.4%-0.5%; and
   the catalyst has a nano hexagonal sheet structure, wherein the nano hexagonal sheet structure has at least one of the following features: a) a thickness is 100-200 nm; b) an area is 0.01-0.05 μm$^2$.

6. An activated catalyst for hydrogen production by electrolysis, comprising the catalyst for hydrogen production by electrolysis according to claim 1 and a sulfate activating layer, wherein the sulfate activating layer comprises sulfate ions distributed on a surface of the catalyst, and the sulfate ions bind to the alkaline-earth metal ions in the catalyst.

7. The activated catalyst for hydrogen production by electrolysis according to claim 6, comprising a nano layer structure distributed on the surface of the catalyst, wherein the nano layer structure comprises a plurality of nano particles with a particle size of larger than 0 nm and is less than 5 nm, and the nano particle is formed by binding the sulfate ions to the alkaline-earth metal ions in the catalyst.

8. The activated catalyst for hydrogen production by electrolysis according to claim 6, wherein the catalyst has at least one of the following features:
   i) M and N are any two of iron, cobalt, and nickel ions;
   ii) M' is selected from $Ca^{2+}$, $Sr^{2+}$, or $Ba^{2+}$;
   iii) $A^{n-}$ is selected from $CO_3^{2-}$, $NO_3^{2-}$, $OH^-$, or $SO_4^{2-}$;

iv) an atomic percentage content of M' in the catalyst is 0.4%-0.5%; and the catalyst has a nano hexagonal sheet structure, wherein the nano hexagonal sheet structure has at least one of the following features: a) a thickness is 100-200 nm; b) an area is 0.01-0.05 µm².

9. An anode for hydrogen production by electrolysis, wherein the anode comprises the catalyst for hydrogen production by electrolysis according to claim 1 or an activated catalyst for hydrogen production by electrolysis comprising the catalyst for hydrogen production by electrolysis and a sulfate activating layer; wherein the sulfate activating layer comprises sulfate ions distributed on a surface of the catalyst, and the sulfate ions bind to the alkaline-earth metal ions in the catalyst;

a plurality of catalyst nanosheets are erectly arranged on a surface of the anode, and mutually and intensively arranged to form an array structure; a specific surface area of the array structure is 40-50 m²/g; and the anode further comprises a conducting substrate for loading the catalyst, and the conducting substrate comprises foam nickel, a nickel mesh, foam iron, or foam nickel iron.

10. A method for hydrogen production by electrolysis, comprising: placing the anode for hydrogen production by electrolysis according to claim 9 and a cathode for hydrogen production by electrolysis in an aqueous solution containing chlorine ions, and applying a working voltage between the anode and the cathode, thereby achieving hydrogen production by electrolysis; and the aqueous solution containing the chlorine ions comprises seawater or chlorine-containing industrial wastewater.

11. A system for hydrogen production by electrolysis, comprising an anode and a cathode, wherein the system for hydrogen production by electrolysis is used for performing hydrogen production by electrolysis on an aqueous solution containing chlorine ions, and the anode comprises the anode for hydrogen production by electrolysis according to claim 9, and the aqueous solution containing the chlorine ions comprises seawater or chlorine-containing industrial wastewater.

12. A method for using the catalyst for hydrogen production by electrolysis according to claim 1 comprising: placing a anode and a cathode for hydrogen production by electrolysis in an aqueous solution containing chlorine ions and sulfate ions, and applying a working voltage between the anode and the cathode, thereby achieving hydrogen production by electrolysis; wherein the anode comprises the catalyst for hydrogen production by electrolysis.

13. The method according to claim 12, wherein the catalyst has at least one of the following features:
i) M and N are any two of iron, cobalt, and nickel ions;
ii) M' is selected from $Ca^{2+}$, $Sr^{2+}$, or $Ba^{2+}$;
iii) $A^{n-}$ is selected from $CO_3^{2-}$, $NO_3^{2-}$, OH, or $SO_4^{2-}$;
iv) an atomic percentage content of M' in the catalyst is 0.4%-0.5%; and
the catalyst has a nano hexagonal sheet structure, wherein the nano hexagonal sheet structure has at least one of the following features: a) a thickness is 100-200 nm; b) an area is 0.01-0.05 µm².

14. A preparation method of an catalyst for hydrogen production by electrolysis, comprising performing a hydrothermal reaction on a mixed reaction solution containing M, N, and M' to prepare the catalyst for hydrogen production by electrolysis having a chemical formula of $[M_{1-x}N_x M'(OH)_2]^{x+}[(A^{n-})_{x/n} \cdot mH_2O]^{x-}$, wherein M and N are any two of scandium, vanadium, chromium, manganese, iron, cobalt, and nickel ions, and M and N are respectively in +2 and +3 valent, M' is selected from alkaline-earth metal ions and is dispersed in the catalyst in an atomic level, $A^{n-}$ is selected from $CO_3^{2-}$, $NO_3^{2-}$, Cl⁻, OH⁻, or $SO_4^{2-}$, x=0.17-0.33, m is an integer of more than or equal to 0, and n=1-3.

15. The preparation method according to claim 14, specifically comprising: performing the hydrothermal reaction on the mixed reaction solution containing a first transition metal compound, a second transition metal compound, and an alkaline-earth metal compound in a molar ratio of (2-5):(2-5):(0.4-1) at 90-120° C. to prepare the catalyst; wherein the first transition metal compound, the second transition metal compound, and the alkaline-earth metal compound respectively contain M, N, and M', and a pH value of the mixed reaction solution is 8-10.

16. The preparation method according to claim 15, specifically comprising:
mixing the first transition metal compound, the second transition metal compound, and the alkaline-earth metal compound with water to form a metal salt solution, adding an alkaline substance to adjust a pH value of the metal salt solution to 8-10, thereby obtaining the mixed reaction solution; and
reacting the mixed reaction solution for 8-12 h at 90-120° C. to prepare the catalyst.

17. The preparation method according to claim 16, wherein the catalyst has at least one of the following features:
i) M and N are any two of iron, cobalt, and nickel ions;
ii) M' is selected from $Ca^{2+}$, $Sr^{2+}$, or $Ba^{2+}$;
iii) $A^{n-}$ is selected from $CO_3^{2-}$, $NO_3^{2-}$, OH⁻, or $SO_4^{2-}$;
iv) an atomic percentage content of M' in the catalyst is 0.4%-0.5%;
the first transition metal compound comprises a soluble nickel salt, the second transition metal compound comprises a soluble iron salt, and the alkaline-earth metal compound comprises a soluble barium salt;
the soluble nickel salt comprises nickel nitrate, the soluble iron salt comprises iron nitrate, and the alkaline-earth metal salt comprises barium nitrate;
concentrations of the first transition metal compound, the second transition metal compound, and the alkaline-earth metal compound contained in the mixed reaction solution are respectively 0.1-1 mmol/L, 0.2-0.5 mmol/L, and 0.1-1 mmol/L; and
the alkaline substance comprises any one of urea, hexamethylenetetraammonium, or triethanolamine, or a combination thereof.

18. The preparation method according to claim 15, wherein the catalyst has at least one of the following features:
i) M and N are any two of iron, cobalt, and nickel ions;
ii) M' is selected from $Ca^{2+}$, $Sr^{2+}$, or $Ba^{2+}$;
iii) $A^{n-}$ is selected from $CO_3^{2-}$, $NO_3^{2-}$, OH⁻, or $SO_4^{2-}$;
iv) an atomic percentage content of M' in the catalyst is 0.4%-0.5%;
the first transition metal compound comprises a soluble nickel salt, the second transition metal compound comprises a soluble iron salt, and the alkaline-earth metal compound comprises a soluble barium salt;
the soluble nickel salt comprises nickel nitrate, the soluble iron salt comprises iron nitrate, and the soluble barium salt comprises barium nitrate; and
concentrations of the first transition metal compound, the second transition metal compound, and the alkaline-earth metal compound contained in the mixed reaction solution are respectively 0.1-1 mmol/L, 0.2-0.5 mmol/L, and 0.1-1 mmol/L.

19. A method for using an anode for hydrogen production by electrolysis comprising a catalyst for hydrogen production by electrolysis or an activated catalyst for hydrogen production by electrolysis comprising the catalyst and a sulfate activating layer;

wherein a chemical formula of the catalyst is $[M_{1-x}N_xM'(OH)_2]^{x+}[(A^{n-})_{x/n}mH2O]^{x-}$, M and N are any two of scandium, vanadium, chromium, manganese, iron, cobalt, and nickel ions, and M and N are respectively +2 and +3 valent, M' is selected from alkaline earth metal ions and dispersed in the catalyst in an atomic level, $A^{n-}$ is selected from $CO_3$, $NO_3$, Cl, OH, or $SO_4$, x is 0.17-0.33, m is an integer of more than or equal to 0, and n is 1-3;

wherein the sulfate activating layer comprises sulfate ions distributed on a surface of the catalyst, and the sulfate ions bind to the alkaline-earth metal ions in the catalyst;

a plurality of catalyst nanosheets are erectly arranged on a surface of the anode, and mutually and intensively arranged to form an array structure; a specific surface area of the array structure is 40-50 $m^2/g$;

the anode further comprises a conducting substrate for loading the catalyst, and the conducting substrate comprises foam nickel, a nickel mesh, foam iron or foam nickel iron; and the method comprises: placing the anode and a cathode for hydrogen production by electrolysis into an aqueous solution comprising chlorine ions, and applying a working voltage between the anode and the cathode, wherein the aqueous solution containing the chlorine ions comprises seawater or chlorine-containing industrial wastewater.

* * * * *